(12) United States Patent
Marinier et al.

(10) Patent No.: US 9,801,161 B2
(45) Date of Patent: Oct. 24, 2017

(54) METHOD AND AN APPARATUS FOR PROVIDING CONTROL INFORMATION FOR MULTI-CARRIER UPLINK TRANSMISSION

(71) Applicant: INTERDIGITAL PATENT HOLDING, INC., Wilmington, DE (US)

(72) Inventors: Paul Marinier, Brossard (CA); Diana Pani, Montreal (CA); Benoit Pelletier, Roxboro (CA); Christopher Cave, Dollard-des-Ormeaux (CA); Lujing Cai, Morganville, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 210 days.

(21) Appl. No.: 13/766,180

(22) Filed: Feb. 13, 2013

(65) Prior Publication Data
US 2013/0155984 A1 Jun. 20, 2013

Related U.S. Application Data

(63) Continuation of application No. 12/610,289, filed on Oct. 31, 2009, now Pat. No. 8,400,935.
(Continued)

(51) Int. Cl.
H04W 72/12 (2009.01)
H04W 72/04 (2009.01)
(Continued)

(52) U.S. Cl.
CPC ....... H04W 72/0406 (2013.01); H04L 5/0007 (2013.01); H04L 5/0053 (2013.01);
(Continued)

(58) Field of Classification Search
CPC ......... H04W 72/1268; H04W 72/1263; H04W 72/1273; H04W 72/1278; H04W 72/1284; H04W 72/1289
(Continued)

(56) References Cited

U.S. PATENT DOCUMENTS

2006/0013182 A1    1/2006  Balasubramanian et al.
2006/0085554 A1*   4/2006  Shah et al. .................... 709/235
(Continued)

FOREIGN PATENT DOCUMENTS

EP            2418904 A1    2/2012
WO    WO 2006/014092 A1    2/2006
(Continued)

OTHER PUBLICATIONS

Rohde & Schwarz, Carrier Aggregation—(One) Key Enabler for LTE-Advanced, 2012, 12 pages.*
(Continued)

*Primary Examiner* — Hoon J Chung
(74) *Attorney, Agent, or Firm* — Condo Roccia Koptiw LLP

(57) ABSTRACT

A method and an apparatus for providing control information for multi-carrier uplink transmission are disclosed. A wireless transmit/receive unit (WTRU) may set a happy bit for enhanced dedicated channel (E-DCH) transmissions on each uplink carrier considering aggregated transmission capability over all uplink carriers. The happy bit is set to "unhappy" if the WTRU is transmitting as much scheduled data as allowed by a current serving grant, the WTRU has enough power available to transmit at a higher rate, and total E-DCH buffer status (TEBS) requires more than a pre-configured period to be transmitted with a current effective data rate aggregated over all uplink carriers. The WTRU may send scheduling information including power head- (Continued)

room measured on the anchor uplink carrier and/or power headroom measured on the supplementary uplink carrier. For power headroom measurements, the WTRU may initiate a short-lived dedicated physical control channel loop on the supplementary carrier.

16 Claims, 10 Drawing Sheets

Related U.S. Application Data

(60) Provisional application No. 61/109,978, filed on Oct. 31, 2008, provisional application No. 61/117,851, filed on Nov. 25, 2008, provisional application No. 61/141,638, filed on Dec. 30, 2008, provisional application No. 61/148,818, filed on Jan. 30, 2009, provisional application No. 61/232,531, filed on Aug. 10, 2009, provisional application No. 61/245,734, filed on Sep. 25, 2009, provisional application No. 61/250,097, filed on Oct. 9, 2009.

(51) Int. Cl.
*H04L 5/00* (2006.01)
*H04W 52/36* (2009.01)
*H04L 27/26* (2006.01)
*H04W 24/10* (2009.01)
*H04W 52/28* (2009.01)

(52) U.S. Cl.
CPC ....... *H04L 27/2601* (2013.01); *H04W 52/365* (2013.01); *H04W 72/1284* (2013.01); *H04W 24/10* (2013.01); *H04W 52/286* (2013.01)

(58) Field of Classification Search
USPC .................. 370/395.4, 395.41, 395.42, 468
See application file for complete search history.

(56) References Cited

U.S. PATENT DOCUMENTS

| | | |
|---|---|---|
| 2006/0221883 A1 | 10/2006 | Damnjanovic et al. |
| 2006/0274712 A1 | 12/2006 | Malladi et al. |
| 2006/0280142 A1 | 12/2006 | Damnjanovic et al. |
| 2007/0047502 A1 | 3/2007 | Marinier et al. |
| 2007/0070908 A1 | 3/2007 | Ghosh et al. |
| 2007/0097962 A1 | 5/2007 | Yoon et al. |
| 2007/0109964 A1 | 5/2007 | Kwak et al. |
| 2007/0297360 A1 | 12/2007 | Joachim et al. |
| 2008/0045255 A1 | 2/2008 | Revel et al. |
| 2008/0254804 A1 | 10/2008 | Lohr et al. |
| 2011/0019625 A1* | 1/2011 | Zhang et al. ................. 370/329 |
| 2011/0075742 A1 | 3/2011 | Zhang et al. |
| 2011/0128926 A1 | 6/2011 | Nama et al. |
| 2011/0158194 A1* | 6/2011 | Musikka ............... H04L 5/0016 370/329 |
| 2012/0033554 A1 | 2/2012 | Shiva et al. |
| 2013/0136077 A1 | 5/2013 | Zhang et al. |

FOREIGN PATENT DOCUMENTS

| | | |
|---|---|---|
| WO | WO 2009/137180 A2 | 11/2009 |
| WO | WO 2010/066170 A1 | 6/2010 |

OTHER PUBLICATIONS

Bergman et al., Continued HSPA Evolution of Mobile Broadband, Jan. 2009, Ericsson Review, p. 7-11.*
Seidel et al., White Paper—Dual Cell HSDPA and its Future Evolution, Jan. 2009, Nomor Research, 5 pages.*
Johansson et al., Multi-Carrier HSPA Evolution, Apr. 26-29, 2009, Vehicular Technology Conference, 2009. VTC Spring 2009. IEEE 69th, 5 pages.*
3rd Generation Partnership Project (3GPP), R1-092762, "DC-HSUPA-E-TFC Selection System Simulation Results," Ericsson, ST-Ericsson, 3GPP TSG RAN WG1, Meeting #57bis, Los Angeles, CA, USA, Jun. 2009, 9 pages.
3rd Generation Partnership Project (3GPP), R2-054557, "E-TFC Selection Algorithm for DC-HSUPA," 3GPP TSG-RAN WG2 meeting #67, Aug. 2009, 2 pages.
3rd Generation Partnership Project (3GPP), R2-085128, "Happy Bit Setting with Improved L2 for UL", InterDigital, 3GPP TSG-WG2 Meeting #63bis, Sep. 29-Oct. 3, 2008, 2 pages.
3rd Generation Partnership Project (3GPP), R2-085706, "UPH Transmission for Dual Cell HSDPA", TSG RAN WG2 #63bis, Prague, Czech Republic, Sep. 29-Oct. 3, 2008, 1 page.
3rd Generation Partnership Project (3GPP), R2-093920, "LTE-UMTS: Inbound mobility to CSG cell from LTE cell," Motorola, 3GPP TSG-RAN WG2#66bis, Los Angeles, U.S.A., Jun. 29-Jul. 3, 2009, 29 pages.
3rd Generation Partnership Project (3GPP), R2-094087, "Report of 3GPP TSG RAN WG2 meeting #66", ETSI MCC, 3GPP TSG RAN WG2 Meeting #66bis, Los Angeles, USA, Jun. 29-Jul. 3, 2009, 1-151.
3rd Generation Partnership Project (3GPP), R2-094372, "On Usage of Happy Bits in Dual Carrier HSUPA", Nokia Siemens Networks, 3GPP TSG-RAN WG2 Meeting #67, Shenzhen, China, Aug. 24-28, 2009, 5 pages.
3rd Generation Partnership Project (3GPP), R2-094383, "Happy Bit for DC-HSUPA," Ericsson, ST-Ericsson, 3GPP TSG RAN WG2 #67, Shenzhen, China, Aug. 24-28, 2009, 3 pages.
3rd Generation Partnership Project (3GPP), R2-094385, "Scheduling Information for DC-HSUPA," Ericsson, St-Ericsson , 3GPP TSG RAN WG2 #67, Shenzhen, China, Aug. 24-28, 2009, 3 pages.
3rd Generation Partnership Project (3GPP), R2-094452, "Triggering and Reporting of SI and Happy Bit in DC-HSUPA," Qualcomm Europe, 3GPP TSG-RAN WG2 #67, Shenzhen, P.R.China, Aug. 24-28, 2009, 3 pages.
3rd Generation Partnership Project (3GPP), R2-094541, "SI Report for DC-HSUPA," Huawei, 3GPP TSG RAN WG2 Meeting #67, Shenzhen, China, Aug. 24-28, 2009, 4 pages.
3rd Generation Partnership Project (3GPP), R2-094542, "Happy Bit for DC-HSUPA", Huawei, 3GPP TSG Ran WG2 Meeting #67, Shenzhen, China, Aug. 24-28, 2009, 4 pages.
3rd Generation Partnership Project (3GPP), R2-094795, "On the Usage of the Happy Bits for DC-HSUPA," InterDigital, 3GPP TSG-RAN WG2 Meeting #67, Shenzhen, China, Aug. 24-28, 2009, 3 pages.
3rd Generation Partnership Project (3GPP), R2-095663, "Happy Bits Usage for DC-HSUPA," InterDigital, 3GPP TSG-RAN WG2 Meeting #67bis, Miyazaki, Japan, Oct. 12-16, 2009, 4 pages.
3rd Generation Partnership Project (3GPP), R2-095716, "Definition for the Happy Bit," Ericsson, ST-Ericsson, 3GPP TSG RAN WG2 #67bis, Miyazaki, Japan, Oct. 12-16, 2009, 7 pages.
3rd Generation Partnership Project (3GPP), R2-09XXXX, "E-TFC Selection in DC-HSUPA," Qualcomm Europe, 3GPP TSG-RAN WG2 #67, Aug. 2009, 7 pages.
3rd Generation Partnership Project (3GPP), R2-09XXXX, "On Greedy Filling Power Allocation in E-TFC Selection for DC-HSUPA," Alcatel-Lucent, 3GPP TSG-RAN WG2 Meeting #67, Shenzhen, China, Aug. 24-28, 2009, 6 pages.
3rd Generation Partnership Project (3GPP), RP-080490, "Dual-Cell HSDPA Operation on Adjacent Carriers," 3GPP TSG RAN #40, Prague, Czech Republic, May 27-30, 2008, 4 pages.
3rd Generation Partnership Project (3GPP), RP-090351, "Support of Home NB and Home eNB enhancements RAN2 Aspects", Huawei, Alcatel-Lucent, TSG-RAN Meeting #43, Biarritz, France, Mar. 2009, 5 pages.
3rd Generation Partnership Project (3GPP), TS 25.133 V8.4.0, "Technical Specification Group Radio Access Network; Requirements for Support of Radio Resource Management (FDD) (Release 8)", Sep. 2008, 1-198.

(56) References Cited

OTHER PUBLICATIONS

3rd Generation Partnership Project (3GPP), TS 25.133 V8.8.0, "3rd Generation Partnership Project, Technical Specification Group Radio Access Network, Requirements for Support of Radio Resource Management (FDD) (Release 8)", Sep. 2009, 1-235.
3rd Generation Partnership Project (3GPP), TS 25.133 V9.1.0, "Technical Specification Group Radio Access Network; Requirements for Support of Radio Resource Management (FDD) (Release 9)", Sep. 2009, 1-236.
3rd Generation Partnership Project (3GPP), TS 25.214 V8.3.0, "Technical Specification Group Radio Access Network; Physical Layer Procedures (FDD) (Release 8)", Sep. 2008, 1-89.
3rd Generation Partnership Project (3GPP), TS 25.214 V8.7.0, "Technical Specification Group Radio Access Network; Physical layer procedures (FDD) (Release 8)", Sep. 2009, 1-93.
3rd Generation Partnership Project (3GPP), TS 25.214 V9.0.0, "Technical Specification Group Radio Access Network, Physical layer procedures (FDD) (Release 9)", Sep. 2009, 1-95.
3rd Generation Partnership Project (3GPP), TS 25.308 V8.3.0, "Technical Specification Group Radio Access Network, High Speed Downlink Packet Access (HSDPA), Overall Description, Stage 2 (Release 8)", Sep. 2008, 1-56.
3rd Generation Partnership Project (3GPP), TS 25.308 V8.7.0, "Technical Specification Group Radio Access Network, High Speed Downlink Packet Access (HSDPA), Overall description, Stage 2 (Release 8)", Sep. 2009, 1-65.
3rd Generation Partnership Project (3GPP), TS 25.308 V9.1.0, "Technical Specification Group Radio Access Network, High Speed Downlink Packet Access (HSDPA), Overall description; Stage 2 (Release 9)", Sep. 2009, 1-65.
3rd Generation Partnership Project (3GPP), TS 25.321 V8.3.0, "Technical Specification Group Access Network, Medium Access Control (MAC), Protocol Specification, (Release 7)", Sep. 2008, 1-165.
3rd Generation Partnership Project (3GPP), TS 25.321 V8.7.0, "Technical Specification Group Radio Access Network, Medium Access Control (MAC), Protocol Specification (Release 8)", Sep. 2009, 1-187.
3rd Generation Partnership Project (3GPP), TS 25.321 V9.0.0, "Technical Specification Group Radio Access Network, Medium Access Control (MAC), Protocol Specification (Release 9)" Sep. 2009, 1-187.
European Telecommunication Standard Institute (ETSI), TS 125. 321 V8.3.0, Universal Mobile Telecommunications System (UMTS), Medium Access Control (MAC), Protocol Specification (3GPP TS 25.321 version 8.3.0 Release 8), Oct. 2008, 1-172 pages.
3$^{rd}$ Generation Partnership Project (3GPP), R1-82249, "Text Proposal for DC-HSDPA assumptions and standards impact", Ericsson, Qualcomm Europe, 3GPP TSG RAN WG1#53, Kansas City, MO, May 5-9, 2008, 18pp.
3$^{rd}$ Generation Partnership Project (3GPP), R2-085326, "Considering about PHR", CATT, 3GPP TSG RAN WG#63bis, Prague, Czech Republic, Sep. 30-Oct. 3, 2008, 6pp.
3rd Generation Partnership Project (3GPP), "E-TFC Selection for DC-HSUPA", InterDigital, 3GPP TSG-RAN WG2, Conference Call, Aug. 11, 2009, 5 pages.

\* cited by examiner

METHOD AND AN APPARATUS FOR PROVIDING CONTROL INFORMATION FOR MULTI-CARRIER UPLINK TRANSMISSION

CROSS REFERENCE TO RELATED APPLICATIONS

This application is a continuation of U.S. application Ser. No. 12/610,289 filed Oct. 31, 2009; claims the benefit of U.S. provisional application Nos. 61/109,978 filed Oct. 31, 2008, 61/117,851 filed Nov. 25, 2008, 61/141,638 filed Dec. 30, 2008, 61/148,818 filed Jan. 30, 2009, 61/232,531 filed Aug. 10, 2009, 61/245,734 filed Sep. 25, 2009, and 61/250, 097 filed Oct. 9, 2009, which are incorporated by reference as if fully set forth.

FIELD OF INVENTION

This application is related to wireless communications.

BACKGROUND

Wireless communication systems keep evolving to meet the needs for providing continuous and faster access to a data network. In order to meet these needs, a multi-carrier system that is capable of using multiple carriers for the transmission of data has been proposed. The use of multiple carriers is expanding in both cellular and non-cellular wireless systems.

A multi-carrier system may increase the bandwidth available in a wireless communication system according to a multiple of how many carriers are made available. For instance, dual-cell high speed downlink packet access (DC-HSDPA) has been introduced in the Release 8 specifications of the third generation partnership project (3GPP) for universal mobile telecommunication systems (UMTS). With this feature, base stations (also referred to as a Node-B) communicate to WTRUs over two distinct carriers simultaneously.

For dual cell operation, each WTRU is assigned an anchor downlink carrier, which carries all dedicated and shared control channels used for high speed downlink shared channel (HS-DSCH), enhanced dedicated channel (E-DCH), and dedicated channel (DCH) operations (e.g., fractional dedicated physical channel (F-DPCH), E-DCH HARQ indicator channel (E-HICH), E-DCH relative grant channel (E-RGCH), E-DCH absolute grant channel (E-AGCH), common pilot channel (CPICH), high speed shared control channel (HS-SCCH), and high speed physical dedicated control channel (HS-PDCCH)). In addition, the WTRU may be assigned a supplementary downlink carrier, which carries CPICH, HS-SCCH and HS-PDSCH for the WTRU. The uplink (UL) transmission remains on a single carrier as in the current systems. The HS-DPCCH feedback information is provided on this UL carrier to the Node-B and contains information for each downlink carrier.

FIG. 1 shows the conventional medium access control (MAC) architecture for DC-HSDPA operations. The MAC layer architecture of DC-HSDPA includes one hybrid automatic repeat request (HARQ) entity per HS-DSCH transport channel.

As data rates continue to increase in the downlink (DL) via the introduction of multiple carriers, the capacity of the UL carrier would be consumed with control channels, (e.g., transmission control protocol (TCP) positive acknowledgement (ACK)/negative acknowledgement (NACK), radio link control (RLC) ACK/NACK and HARQ feedback). In order to increase data rates and capacity in the UL, it would be desirable to introduce dual cell or multi carrier uplink E-DCH transmissions. Since the achievable data rate grows linearly with the number of additional uplink carriers, E-DCH data rates of up to 23 Mbps could be achieved in dual-carrier high speed uplink packet access (HSUPA), for example.

The E-DCH, introduced in Release 6 of the specifications of the 3GPP, is based on a grant mechanism. At a high level, each Node-B has a means to control the level of interference caused by WTRUs by increasing or decreasing the serving grant. The serving grant represents the amount of power a WTRU is allowed to use for the E-DCH, which translates to a data rate. The amount of grant a WTRU gets is determined by the network based on the system load and the traffic offered. To help the network make suitable decisions, the WTRU provides buffer and power headroom information to the serving Node-B via scheduling information (SI) and happy bit.

SUMMARY

A method and an apparatus for providing control information for multi-carrier uplink transmission are disclosed. A WTRU may set a happy bit for E-DCH transmissions on each uplink carrier considering aggregate transmission capability of all uplink carriers. The happy bit is set for each uplink carrier to "unhappy" if the WTRU is transmitting as much scheduled data on the uplink carrier as allowed by a current serving grant, the WTRU has enough power available on the uplink carrier to transmit at a higher data rate, and total E-DCH buffer status (TEBS) requires more than a pre-configured time period to be transmitted with a current effective data rate aggregated over all uplink carriers. The WTRU may send scheduling information including power headroom as measured on the anchor uplink carrier and/or power headroom as measured on the supplementary uplink carrier. For the power headroom measurements on the supplementary carrier, the WTRU may initiate a short-lived power control loop on the supplementary uplink carrier.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, a machine-to-machine (M2M) device, a sensor, or any other type of device capable of operating in a wireless environment. When referred to hereafter, the terminology "Node-B" includes but is not limited to a base station, a site controller, an access point (AP), or any other type of interfacing device capable of operating in a wireless environment.

The network may assign at least one downlink and/or at least one uplink carrier as an anchor downlink carrier and an anchor uplink carrier, respectively. For example, the anchor carrier may be defined as the carrier for carrying a specific set of control information for downlink/uplink transmissions. Any carrier that is not assigned as an anchor carrier is a supplementary carrier. Alternatively, the network may not assign an anchor carrier and no priority, preference, or default status may be given to any downlink or uplink carriers. Hereinafter, the terminologies "anchor carrier" and "primary carrier", and "supplementary carrier" and "secondary carrier" will be used interchangeably, respectively. The "first carrier" (or "second carrier") may be either the anchor carrier or the supplementary carrier. For multi-carrier operation more than one supplementary carriers or secondary carriers may exist.

The embodiments are provided for generating and transmitting control information enabling uplink scheduling for multi-carrier operations. The control information may comprise measurements indicative of WTRU power situation, buffer information, measurements indicative of the need of the WTRU for more uplink transmission resources. Even though embodiments are described in terms of dual uplink carrier, it should be understood that the embodiments described herein are applicable to multiple uplink carriers as well. Even though the embodiments are disclosed with reference to control channels and data channels associated to wideband code division multiple access (WCDMA), it should be noted that the embodiments are applicable to any wireless communication technologies that are currently existing or will be developed in the future, such as long term evolution (LTE) or LTE-A. It should also be noted that the embodiments described herein may be applicable in any order or combinations.

Figure 1:
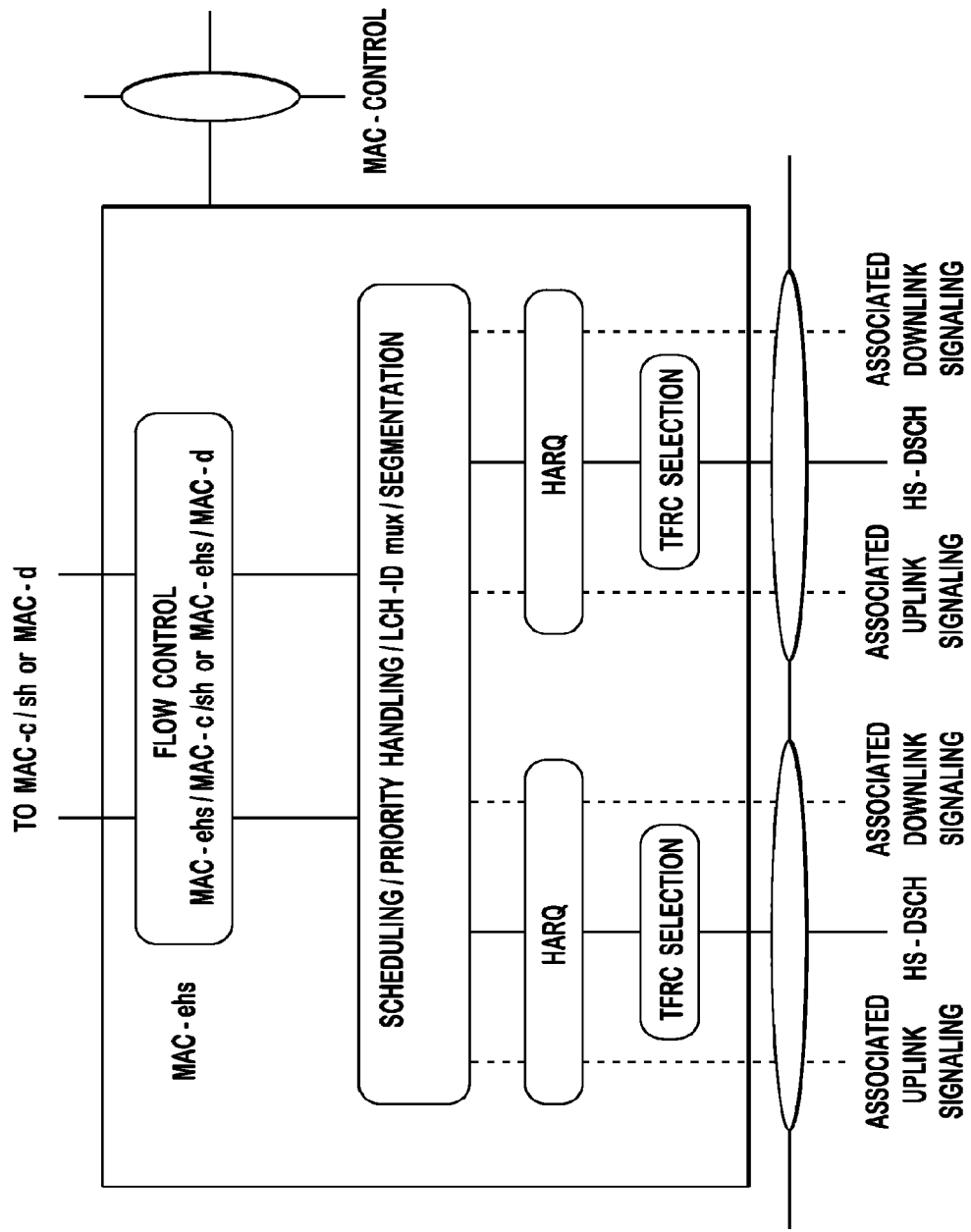
FIG. 1 shows the conventional medium access control (MAC) architecture for DC-HSDPA operations.
Figure 2:
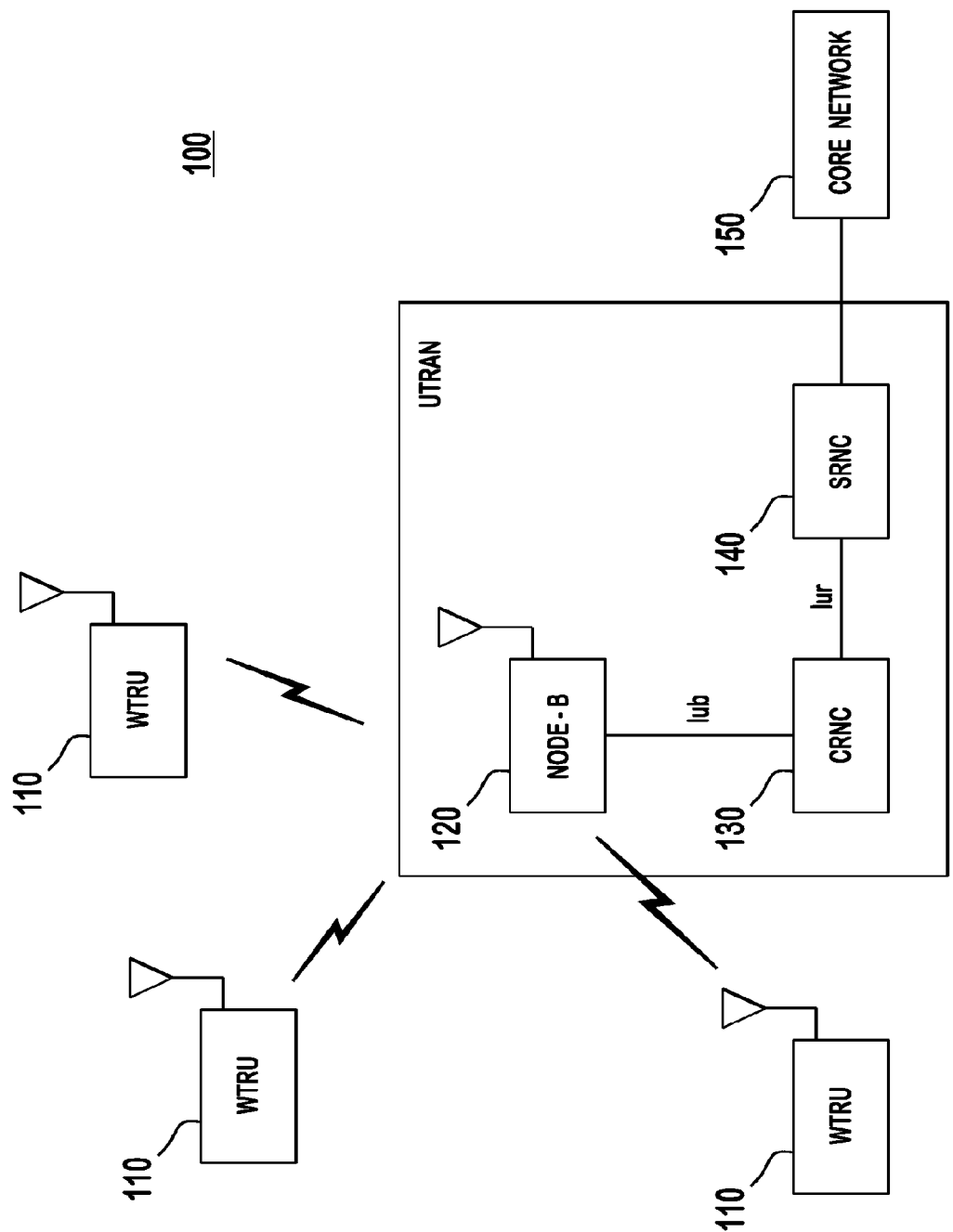
FIG. 2 shows a wireless communication system including a plurality of WTRUs, a Node B, a controlling radio network controller (CRNC), a serving radio network controller (SRNC), and a core network.

FIG. 2 shows a wireless communication system 100 including a plurality of WTRUs 110, a Node B 120, a controlling radio network controller (CRNC) 130, a serving radio network controller (SRNC) 140, and a core network 150. The Node B 120 and the CRNC 130 with the SRNC 140 may collectively be referred to as the universal terrestrial radio access network (UTRAN).

As shown in FIG. 2, the WTRUs 110 are in communication with the Node B 120, which is in communication with the CRNC 130 and the SRNC 140. Although three WTRUs 110, one Node B 120, one CRNC 130, and one SRNC 140 are shown in FIG. 2, it should be noted that any combination of wireless and wired devices may be included in the wireless communication system 100.

Figure 3:
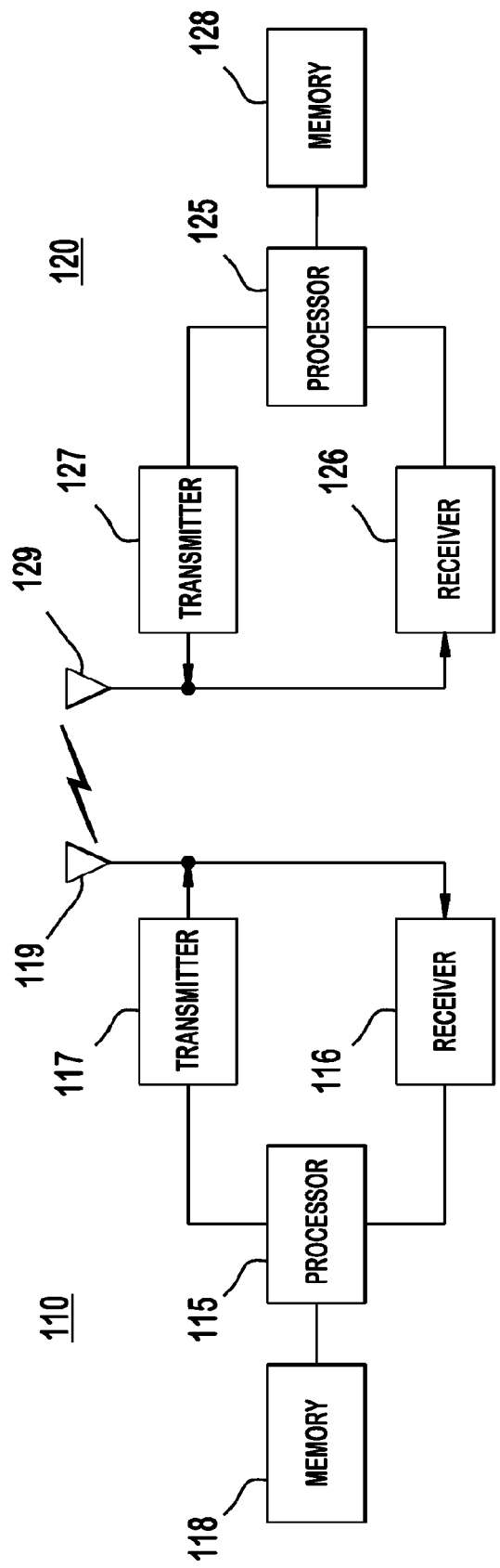
FIG. 3 is a functional block diagram of the WTRU and the Node B of the wireless communication system of FIG. 2.
Figure 4:
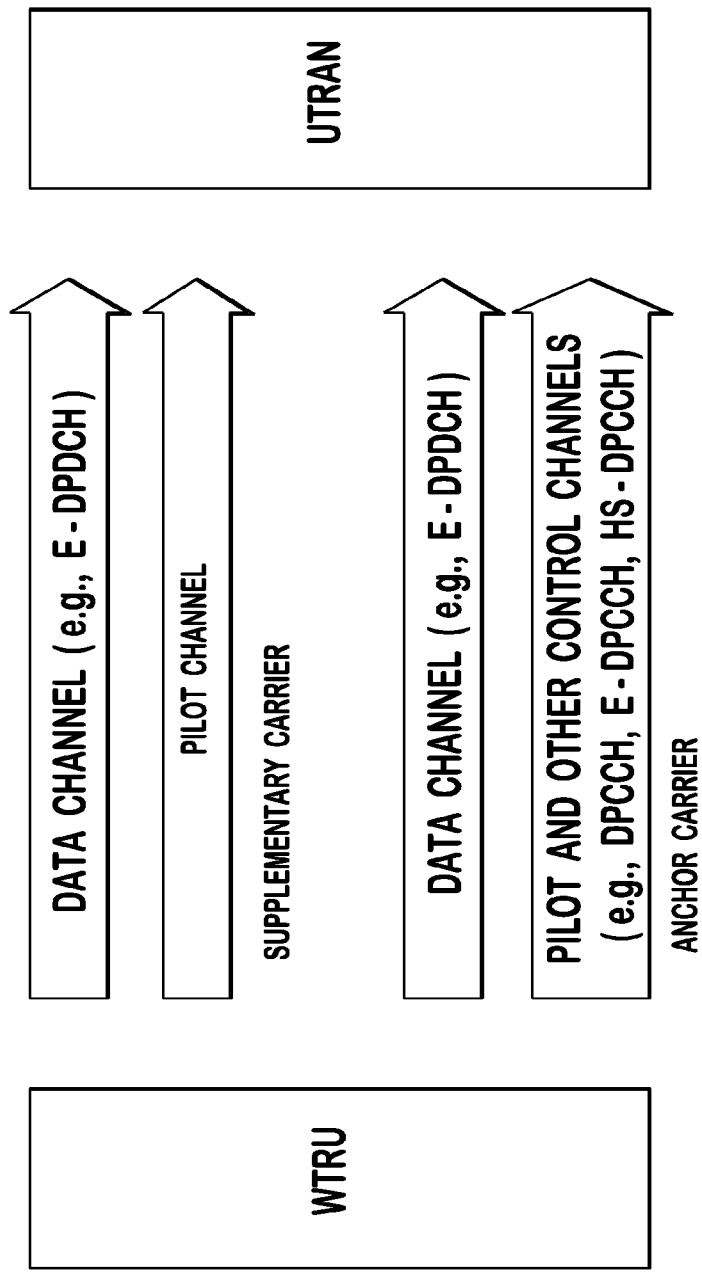
FIG. 4 shows an example that a WTRU transmits two uplink carriers to the UTRAN.

FIG. 3 is a functional block diagram of the WTRU 110 and the Node B 120 of the wireless communication system 100 of FIG. 2. As shown in FIG. 3, the WTRU 110 is in communication with the Node B 120 and both are configured to perform a method of providing control information for multi-carrier uplink transmission. The WTRU 110 includes a processor 115, a receiver 116, a transmitter 117, a memory 118, an antenna 119, and other components (not shown) that may be found in a typical WTRU. The memory 118 is provided to store software including operating system, application, etc. The processor 115 is provided to perform, alone or in association with the software, a method of providing control information for multi-carrier uplink transmission in accordance with embodiments disclosed below. The receiver 116 and/or the transmitter 117 are capable of receiving and/or transmitting over multiple carriers. Alternatively, multiple receivers or transmitters may be included in the WTRU 110. The receiver 116 and the transmitter 117 are in communication with the processor 115. The antenna 119 is in communication with both the receiver 116 and the transmitter 117 to facilitate the transmission and reception of wireless data.

The Node B 120 includes a processor 125, a receiver 126, a transmitter 127, a memory 128, an antenna 129, and other components (not shown) that may be found in a typical base station. The processor 125 is configured to support a method of providing control information for multi-carrier uplink transmission in accordance with embodiments disclosed below. The receiver 126 and the transmitter 127 are in communication with the processor 125. The receiver 126 and/or the transmitter 127 are capable of receiving and/or transmitting over multiple carriers. Alternatively, multiple receivers or transmitters may be included in the Node B 120. The antenna 129 is in communication with both the receiver 126 and the transmitter 127 to facilitate the transmission and reception of wireless data.

Embodiments for indicating by the WTRU for the need or no need of additional uplink resource for multi-carrier operations are described hereafter. In the context of HSPA operations, the need or no-need of the additional uplink resource is indicated by a single-bit indication called "happy bit" carried on the uplink control channel, (i.e., E-DPCCH). A happy bit is a single bit indicating whether or not a WTRU is currently "happy" with its current allowed uplink transmission data rate. The happy bit is transmitted by the WTRU every E-DCH transmission and is carried on the E-DPCCH. The WTRU reports that it is happy when it has ability to empty its transmission buffer in a certain configured amount of time given the current grant and the number of active HARQ processes.

Under the current 3GPP standards, for every E-DCH transmission, the happy bit is set to "unhappy" if the following three criteria are met:

(1) the WTRU is transmitting as much scheduled data as allowed by the current Serving_Grant in E-DCH transport format combination (E-TFC) selection;

(2) the WTRU has enough power available to transmit at higher data rate; and (3) based on the same power offset as the one selected in E-TFC selection to transmit data in the same transmission time interval (TTI) as the happy bit, the total E-DCH buffer status (TEBS) would require more than Happy_Bit_Delay_Condition ms to be transmitted with the current Serving_Grant×the ratio of active HARQ processes to the total number of HARQ processes. The first criterion is true for a deactivated HARQ process and the ratio of the third criterion is 1 for 10 ms TTI. If at least one of the above three criteria is not met, the happy bit is set to "happy."

In the context of DC-HSUPA, setting of the happy bit is defined when two uplink carriers are used. With two uplink carriers configured, the happy bit may be sent on each uplink carrier and may take a different value on each uplink carrier.

When only one transport block is transmitted on an E-DCH in a TTI, (i.e., only one uplink carrier is transmitting E-DPDCH and E-DPCCH), the WTRU may use the 3GPP Release 8 or earlier rules to the active uplink carrier.

When two transport blocks are transmitted on an E-DCH on two uplink carriers in a TTI, (i.e., both uplink carriers are transmitting E-DPDCH and E-DPCCH), one happy bit is sent per uplink carrier. The first two criteria for setting the happy bit (criteria (1) and (2) above) are applied to each carrier independently. The third criterion (3) above considers the aggregate transmission capability of both carriers. This may be achieved by first calculating the total effective data rate and then comparing it with the TEBS and the delay condition. The happy bit may be set to "unhappy" for a given carrier when a WTRU is using all its grant on that carrier, has sufficient headroom to support higher data rates on that carrier, and the time it would take in the current state taking both carriers into consideration to empty the buffer is longer than a given threshold. In the context of DC-HSUPA, the happy bit setting rules may be rewritten as follows.

If one transport block is transmitted over an E-DCH, the happy bit may be set to "unhappy" if the three following criteria are met:

(1) the WTRU is transmitting as much scheduled data as allowed by the current Serving_Grant in E-TFC selection;

(2) the WTRU has enough power available to transmit at higher data rate; and (3) based on the same power offset as the one selected in E-TFC selection to transmit data in the same TTI as the happy bit, the TEBS would require more than Happy_Bit_Delay_Condition ms to be transmitted with the current Serving_Grant×the ratio of active processes to the total number of processes. The first criterion is true for a deactivated HARQ process and the ratio of the third criterion is one (1) for 10 ms TTI. Otherwise, the happy bit may be set to "happy."

If two transport blocks are transmitted over an E-DCH, the happy bit for each carrier may be set to "unhappy" if the three following criteria are met:

(4) the WTRU is transmitting as much scheduled data on the carrier as allowed by the current Serving_Grant in E-TFC selection for that carrier;

(5) the WTRU has enough power available on that carrier to transmit at a higher data rate; and (6) TEBS would require more than a threshold amount of time (for example, Happy_Bit_Delay_Condition_2TB in millisecond) to be transmitted with the current effective data rate aggregated over all uplink carriers. For each uplink carrier, the effective data rate is calculated based on the same power offset as the one selected in E-TFC selection to transmit data in the same TTI and the carrier as the happy bit, and for each carrier using the current specific Serving_Grant×the specific ratio of active HARQ processes to the total number of HARQ processes. The current data rate aggregated over all uplink carriers is obtained by summing the effective data rate of all uplink carriers.

The first criterion is true for a deactivated HARQ process and the ratio of the third criterion is one (1) for 10 ms TTI. Otherwise, the happy bit may be set to "happy."

The threshold amount of time (e.g., Happy_Bit_Delay_Condition_2TB value) may be signaled by the network. Alternatively, the Happy_Bit_Delay_Condition_2TB value may be the same as the conventional Happy_Bit_Delay_Condition value that is used where one transport block, (i.e., one uplink carrier), is transmitted.

In accordance with another embodiment, the happy bit on each uplink carrier may be set according to the respective power headroom conditions and individual grants of each uplink carrier. This means that the happy bit may be set to "happy" on one uplink carrier while the happy bit is set to "unhappy" on the other uplink carrier, if, for instance, there is enough power headroom to transmit at a higher data rate on the other uplink carrier, or if the grant on the other uplink carrier is lower.

Alternatively, the happy bit on one uplink carrier (e.g., the anchor uplink carrier) is set according to the combined conditions (grant and power headroom) of both uplink carriers. In this case, the happy bit may be set to "unhappy" (1) if the WTRU is transmitting as much scheduled data as allowed by the current serving grants on both uplink carriers in E-TFC selection for both uplink carriers, (2) if the WTRU has enough power available to transmit at a higher data rate on any or all of the uplink carriers; or (3) based on the same power offset(s) as the one selected in E-TFC selection (on both uplink carriers) to transmit data in the same TTI as the happy bit, if total E-DCH buffer status (TEBS) would require more than a threshold amount of time, (e.g., Happy_Bit_Delay_Condition ms, or other value), to be transmitted with the current serving grants, taking into account the ratio of active processes to the total number of processes on each carrier.

If the happy bit on one uplink carrier is set according to the combined conditions of both uplink carriers, the happy bit on the second uplink carrier may be re-interpreted in one or a combination of the following:

(1) The happy bit may be set to "happy" if the power headroom on the second uplink carrier is larger than the power headroom on the first uplink carrier, and "unhappy" otherwise. This information helps the network determine which carrier the grant should be increased on; or (2) Alternatively, the happy bit on the second uplink carrier may be set as per the conventional rules for happy bit setting considering the grant and power headroom conditions on the second uplink carrier only (or on the first uplink carrier only).

Alternatively, additional information for uplink scheduling may be transmitted via the happy bits by the WTRU. For example, the two happy bits (one happy bit per uplink carrier) may be optioned for different usages. For instance, one happy bit may be used to indicate overall happiness status of the WTRU in accordance with one of the embodiments disclosed herein, while the other happy bit may carry information totally different. Hereinafter, the former one is referred to as "a primary happy bit" and the later one is referred to as "a secondary happy bit".

The secondary happy bit may be set (to either "0" or "1") depending on a condition that the power headroom of the anchor carrier is larger than the power headroom of the secondary carrier. The power headroom may correspond to, or may be equivalent to, one or a combination of the following measurements: DPCCH power (i.e., the carrier with the lowest DPCCH power translates to the carrier with the highest power headroom), uplink power headroom value (per carrier UE power headroom (UPH) value calculated and reported in the SI), or an averaged DPCCH power of each carrier, for example over N slots, where N is a integer that may be predetermined in the WTRU or configured by the network. For example, the number of slots for averaging may be three (3), which is equivalent to the averaged DPCCH used in the NRPM calculation.

Alternatively, the secondary happy bit may be set (to either "0" or "1") depending on at least one of the conditions that the power headroom of the anchor carrier is larger than the power headroom of the secondary carrier by a configured threshold, (i.e., the power headroom difference is above a threshold), that the power headroom of the anchor carrier is larger than the power headroom of the secondary carrier for a configured or predetermined period of time, optionally by a configured threshold, or that the DPCCH power of the anchor carrier averaged across a number of sub-frames or slots is no larger than that of the secondary carrier (optionally, by a pre-defined or pre-configured threshold). Alternatively, the secondary happy bit may be set (to either "0" or "1") based on comparison results (optionally averaged across multiple sub-frames or slots) that are generated, at each sub-frame, by comparing the DPCCH power of the anchor carrier to that of the secondary carrier. Alternatively, the secondary happy bit may be set (to either "0" or "1") based on comparison results (optionally averaged across multiple sub-frames or slots) that are generated, at each sub-frame, by comparing the power headroom of the anchor carrier to that of the secondary carrier. The averaging method may be either arithmetic average with truncation or majority vote, or the like.

The E-TFC selection procedure may select only one carrier for E-DCH transmission in a TTI (that is, only one carrier is E-DCH active and thus transmitting E-DPDCH and E-DPCCH). In this case, only one E-DPCCH (and thus only one happy bit) is transmitted on the E-DCH active carrier and no happy bit is transmitted over the E-DCH inactive carrier. The WTRU may transmit a single happy bit on either the anchor carrier or the supplementary carrier. The primary happy bit may be transmitted over the anchor carrier and the secondary happy bit may be transmitted over the supplementary carrier, or vice versa, regardless of the number of active E-DCH carriers.

When both carriers are E-DCH active, the primary happy bit may be transmitted over the anchor carrier and the secondary happy bit may be transmitted over the secondary carrier, or vice versa. If only one carrier is E-DCH active, the primary happy bit may be transmitted on the E-DCH active carrier (regardless of whether or not it is the anchor carrier) and the secondary happy bit may not be transmitted.

It should be noted that although the above embodiments are described in the context of two uplink carriers, the same may be used for the case of more than two uplink carriers.

In accordance with another embodiment, the rules for setting the happy bits may be applied individually to each carrier regardless of the number of transport blocks being transmitted. Alternatively, the conventional (3GPP Release 8 or earlier) rules for happy bit may be used on each carrier individually. Optionally, the WTRU may use two different values for the Happy_Bit_Delay_Condition for each uplink carrier as configured by the network: one associated with the anchor uplink carrier and the other associated with the supplementary uplink carrier.

Embodiments for triggering, and transmitting, WTRU control information (i.e., scheduling information) for multi-carrier operations are described hereafter. In HSUPA single-carrier operations with improved L2 on the uplink (e.g., a WTRU is configured with a MAC-is/i), several triggers are defined to transmit SI. Transmission of SI is triggered when a WTRU cannot transmit data at all (due to HARQ processes being not activated, grant being too low, etc.) and the size of the transmit buffer becomes larger than 0; when the serving grant is zero and new higher priority data than what is currently in the transmission buffer arrives (this is used to inform the Node-B that new higher priority data has arrived); when periodic SI is triggered as configured by the network; or when there is a change of E-DCH serving cell and the new serving E-DCH cell is on a different Node-B. These mechanisms need to be adapted or changed to function properly in the context of multi-carrier operations, for example DC-HSUPA. The actual changes may depend on the information carried on the SI.

Figure 11:
FIG. 11 shows scheduling information format in accordance with one embodiment.

For multi-carrier operations, the scheduling information (SI) may be modified such that it provides the UL power headroom measurement for each carrier individually. More specifically, the format of the SI may be expanded to include UPH for the supplementary carrier, as shown in FIG. 11, where $UPH_A$ and $UPH_S$, correspond to the ratio of the maximum WTRU transmission power and the corresponding anchor and supplementary DPCCH code power, respectively.

Alternatively, the WTRU may report one UPH measurement, and the Node-B may infer the UPH of the other carrier based on Node-B internal measurements and parameters, such as a noise rise difference between the carriers and/or the DPCCH signal-to-interference ratio (SIR) target on each carrier.

Alternatively, a single UPH may be calculated and reported as:

$$UPH = P_{max,tx}/(P_{DPCCH1} + P_{DPCCH2}), \quad \text{Equation (1)}$$

where $P_{max,tx}$ is the total maximum output power that can be transmitted by the WTRU and $P_{DPCCH1}$ and $P_{DPCCH2}$ represent the transmitted code power on DPCCH of carrier 1 and carrier 2, respectively. In the case where per-carrier maximum transmission powers are configured, $P_{max,tx}$ may represent the sum of the per-carrier maximum transmission powers.

Alternatively, the conventional scheduling information format remains unchanged, but the WTRU may report the SI individually in each carrier. For instance, if the SI is sent over the anchor carrier it reports the UPH of the anchor carrier ($UPH_A$), and if it sent over the supplementary carrier it reports the UPH of the supplementary carrier ($UPH_S$). More specifically, the UPH for the anchor carrier ($UPH_A$) is the ratio of the maximum WTRU transmission power and the DPCCH code power on the anchor carrier, and the UPH for the supplementary carrier ($UPH_S$) is the ratio of the maximum WTRU transmission power and the DPCCH code power on the supplementary carrier.

The buffer information fields (i.e., TEBS, highest priority logical channel ID (HLID), and highest priority logical channel buffer status (HLBS) of the two SIs may carry common information or may be different. Sending the scheduling information (SI) over the two uplink carriers independently with the common buffer status information would be inefficient. This problem would be overcome by the embodiments disclosed herein.

Multiple different SI types are defined herein.

SI type A: This SI contains the same information fields as the 3GPP Release 8 SI, where the UPH carries the headroom as measured on the anchor carrier. The SI type A carries the following fields: UPH of anchor carrier ($UPH_A$), TEBS, highest priority logical channel buffer status (HLBS), and highest priority logical channel ID (HLID).

SI type S: This SI contains the same information fields as the SI type A but the UPH carries the headroom as measured on the supplementary carrier instead of anchor carrier. The SI type S carries the following fields: UPH of supplementary carrier ($UPH_S$), TEBS, HLBS, and HLID.

SI type AS: This SI contains the same information fields as the SI type A but the UPH carries the headroom of both anchor and supplementary carriers. The SI type AS carries the following fields: $UPH_A$, $UPH_S$, TEBS, HLBS, and HLID. Alternatively, the two fields $UPH_A$ and $UPH_S$ may be carried in one field carrying the combined information. It should be noted that the number of bits assigned to each field may be the same as in the current (3GPP Release 8) SI, or the number of bits may be changed to accommodate the additional information. This SI type may also be interpreted as a legacy SI (e.g., Release 8) with an additional field carrying the UPH of the supplementary carrier.

SI type E: This SI contains the same information fields as the SI type A but the UPH carries the headroom of either anchor carrier or supplementary carrier. The SI type E carries the following fields: $UPH_A$ or $UPH_S$, TEBS, HLBS, HLID, and an additional field to indicate whether the first field corresponds to $UPH_A$ or $UPH_S$. The SI type E may replace SI type A and SI type S as it carries the same information fields (except for the indication bit).

SI type R: This SI accounts for the fact that the other SI already contains the buffer status information (TEBS, HLBS, HLBS, HLID) such that the space for the buffer status information may be used for other purposes. The SI type R may carry $UPH_A$ or $UPH_S$, and the spare fields may be used for other purposes. For example, the spare fields may be used to indicate the causes of the SI reporting triggering, as an extension of the TEBS for bigger MAC buffer size, for SI type indication as described below, etc.

In the case where the SI type requires more than 18 bits (the size of the 3GPP Release 8 SI), then a new entry may be defined in the conventional E-DCH transport block size tables or the conventional E-DCH transport block size tables may be modified to support the new SI size. Alternatively, the value of the first non-zero entry in the E-DCH transport block size tables may depend on whether or not the WTRU is configured to transmit a specific SI type (e.g., SI type AS). For example, if the WTRU is not configured to transmit SI type AS, then the value of the first non-zero entry (or the entry for SI stand-alone transmission) for all E-DCH transport block size tables remains 18 bits as in the 3GPP Release 8 E-DCH transport block size tables, whereas if the WTRU is configured to transmit SI type AS, then the first non-zero entry (or the entry for SI stand-alone transmission) in the E-DCH transport block size tables may be different, (for example, 23 bits if the number of bits for $UPH_A$ and $UPH_S$ are both 5 bits as the 3GPP Release 8). Alternatively, the SI type containing more than 18 bits may be transmitted only when piggybacked to other data.

Alternatively, additional SI formats may be defined for the case where some fields of the 3GPP Release 8 SI may not be necessary. For instance, the 3GPP Release 8 SI includes TEBS, HLBS, HLID and UPH, but it may not be necessary to transmit the HLBS, HLID, and/or TEBS every time if the reason for sending the SI is to convey information about power headroom on the carriers. In this case, the size of the SI may be maintained less than or equal to 18 bits thus avoiding the need for defining additional transport block size entry or having to define additional E-TFC transport block size tables. In the case where the total number of bits required for the subset of SI fields is less than 18, the remaining bits may be set to pre-defined values or may be defined as spare.

Optionally, if SI triggering is configured on both uplink carriers, the WTRU may be configured with an SI format that contains only $UPH_S$, (or both $UPH_S$ and $UPH_A$). Other information, (i.e., TEBS, HLID, and HLBS), in this SI may not be provided, as it is assumed that they have already been provided with the SI on the other uplink carrier, (e.g., anchor carrier). This will allow the WTRU not to duplicate the same information.

To distinguish the different SI types, an SI type indication may be provided. For example, for the SI type indication, a new field may be included in the MAC header, or a logical channel ID may be reserved for this purpose. Alternatively, the carrier over which the SI is transmitted may carry this information, (e.g., the WTRU transmits SI type S over the supplementary uplink carrier only). Alternatively, the LCH-ID 0, (i.e., LCH-ID field in the MAC header set to 1111), or alternatively LCH-ID 0 followed by a new reserved value of the spare bits after the LCH-ID 0 may be used to indicate the presence of the SI. Alternatively, the time when the SI is transmitted or the HARQ process number may also be used to distinguish SI types.

Alternatively, one or several spare value(s) of the MAC-i header may be used to distinguish the SI types. Alternatively, the TEBS field set to '0' along with HLID field or of certain bits of the HLID field set to a value different than '0' may be used to distinguish between different SI types. In 3GPP Release 8, the HLID field is constrained to be set to '0' in case TEBS is set to '0.' Thus, the use of a value different than '0' for the HLID field when TEBS is set to '0' may be used to indicate a special format of the SI. This special format either may not contain the TEBS, HLID, and/or HLBS information, or may contain the TEBS, HLID, and/or HLBS information in additional fields, (e.g., TEBSprime, HLIDprime, HLBSprime).

Alternatively, the WTRU may be configured by higher layers to only use one specific SI type for transmission on a given UL carrier. This removes the need for additional signaling to indicate the SI type, at the expense of flexibility. For example, SI type A may be transmitted over the anchor carrier and SI type S may be transmitted over the secondary carrier.

When the supplementary uplink carrier is disabled, (i.e., there is no DPCCH being transmitted on the supplementary uplink carrier), the WTRU may only send SI type A in accordance with the conventional rules. Alternatively, the WTRU may still send SI type S or AS along with SI type A in that case with the $UPH_S$ set to zero.

Embodiments for triggering transmission of control information for enabling uplink scheduling are disclosed. More specifically for HSPA operations, this control information may comprise the scheduling information (SI). The triggers may be applicable not only to SI type S and type AS, but also to SI type A (legacy) and SI type E or R. Furthermore, these rules and triggers may be independently applied to both anchor and secondary uplink carriers. The rules for triggering transmission of the SI type A may be the same as the conventional rules to transmit the SI in 3GPP Release 8.

Alternatively, a periodic measurement may be configured by the network where a short-lived power control loop is initiated to measure the headroom on the supplementary carrier, for example when it is de-activated. For example, in HSPA operations, the short-lived DPCCH loop comprises the transmission and reception of uplink DPCCH and downlink DPCCH(s) or F-DPCH(s) for a short duration to establish power control loop and measure the power headroom on the supplementary uplink carrier. SI type S or SI type AS may be transmitted over either the anchor uplink carrier or the supplementary uplink carrier once the measurement and the power headroom calculation on the supplementary uplink carrier is complete. At this point, the WTRU may turn off the DPCCH transmission on the supplementary carrier. Alternatively, the WTRU may be configured to wait for a given time before turning off the DPCCH transmission on the supplementary carrier. Alternatively, the WTRU may wait for an explicit signal from the network to turn off (or continue) the DPCCH transmission on the supplementary carrier. For example, the WTRU may monitor an E-AGCH associated to the supplementary uplink carrier or an HS-SCCH for a specific command regarding the state of the DPCCH transmission on the supplementary uplink carrier. Optionally, the WTRU may stop monitoring the network indication and turn off the DPCCH transmission on the supplementary carrier after a given wait timer has expired.

The short-lived power control loop itself and/or the power headroom measurement on the supplementary uplink carrier may be triggered by one or a combination of the following events: when $UPH_A$ becomes smaller than a threshold, when TEBS becomes larger than a threshold, when the time it would take to empty the transmission buffer given the current grant, HARQ power offset and the ratio of active HARQ processes (on the anchor uplink carrier) is longer than a configured value, when a periodic timer has expired, (i.e., the power headroom measurement and/or the short-lived power control loop is triggered periodically), when SI transmission is triggered on the anchor carrier (for any reason), when the grant on the anchor carrier is zero and data becomes available in the buffer, and/or when periodic SI transmission is triggered on the anchor carrier. Optionally, any of the above triggers necessitating power headroom measurement on the supplementary carrier may be carried out with the short-lived power control loop.

When the supplementary uplink carrier is enabled, (i.e., there is a DPCCH being transmitted on the uplink supplementary carrier), one or more of the following rules may be used, in any order or combination.

(1) SI type A, or alternatively SI type AS, may be transmitted in accordance with the 3GPP Release 8 rules. Optionally, only SI type AS may be transmitted in this case based on the 3GPP Release 8 SI triggering rules.

(2) For periodic SI triggering (for both cases of zero and non-zero grant), the network may configure separate and independent cycles for sending SI type A, SI type S, and/or SI type AS. Optionally, SI type A and either of SI type S or SI type AS may be transmitted.

(3) The network may configure a single periodic SI trigger cycle for transmission of both SI type A and SI type S or alternatively for SI type A and SI type AS. The SI type transmitted may alternate in time, according to a known pattern by the WTRU and the network. For instance, this pattern may be pre-defined or based on one or a combination of the connection frame number (CFN), HARQ process, E-DCH radio network temporary identity (E-RNTI) and other configured parameters. This scheme may be applied to one or both periodic SI triggers, (i.e., triggers related to T_SING and T_SIG timers).

(4) The WTRU may be configured to use one or more common timers, (for example, T_SING and/or T_SIG), for transmission of both SI type A and SI type S or alternatively for SI type AS. The WTRU may use each common timer for triggering the SI for all uplink carriers. Alternatively, the WTRU may use independent timers with the same value and start time to trigger the SI. Since T_SING and T_SIG are used when SG=0 and when SG is non-zero, respectively, there may be situations where one carrier has zero grant, while the other carrier has a non-zero grant. In this case, the timer used in each carrier may be different and the timer may expire at different times, but when SG=0 on both carriers or SG < >0 on all uplink carriers the timers will be common and synchronized, and therefore may expire at the same time. Alternatively, in order to reduce complexity and allow the SIs to be triggered together, one timer or one timer value, (either T_SING or T_SIG), may be allowed to be used at a time by all uplink carriers. The WTRU may use different timer values under these conditions, but once SI is triggered, the WTRU may reset them all to keep synchronization. Once the timer in use is triggered, both SI type A and S (or alternatively SI type AS) may be generated and reported.

In order to determine which timer or timer value to use in different situations a set of rules may be defined depending on the serving grant status of the two carriers. T_SING may be utilized for the case where none of the carriers has SG allocated for the WTRU, and T_SIG may be used for the case where the WTRU has SG for both carriers. In the cases that one carrier has SG while the other does not, the two carriers may still share a common timer or timer value, which may be either T_SING or T_SIG, or alternatively a third timer that may be configured or used differently in either cycle or start timing.

Optionally, determining the use of the timers may be based on network configuration of the HARQ processes for the two carriers. T_SING may be utilized for the case where all HARQ processes are deactivated by the network on both carriers, and T_SIG may be used for the case where each carrier has at least one activated HARQ process configured. In the case where one carrier has at least one HARQ process activated while the other has none, the two carriers may share a common timer, which may be either T_SING or T_SIG, or alternatively a third timer that may be configured differently in either cycle or start timing.

The grant status and HARQ process configuration may be jointly taken into account when deciding the use of the timers. More specifically, the conditions of use of each timer may be as follows:

For example, if both carriers have zero serving grant, regardless the condition of HARQ processes, T_SING may be used and started in both carriers. If none of the two carries has any HARQ process activated, regardless of the grant status, T_SING may be used and started in both carriers. If one carrier has zero serving grant regardless of its HARQ configuration status, and one carrier has no HARQ process activated regardless of its grant status, T_SING may be used and started. If both carriers have non-zero serving grant and at least one HARQ process is activated on each carrier, T_SIG may be used and started in both carriers. If one carrier has non-zero serving grant and at least one HARQ process is activated on that carrier, and the other carrier has zero serving grant regardless of its HARQ configuration status, either T_SIG or T_SING, or a third timer may be used and started. If one carrier has non-zero serving grant and at least one HARQ process is activated on that carrier, and the other carrier has no activated HARQ processes regardless its grant status, either T_SIG or T_SING, or a third timer may be used and started. Even though not listed in detail, other forms of combination of the HARQ configuration and serving grant status may also apply.

As an example of the above periodic SI triggering rules may be rewritten as follows. This example is illustrative only, other embodiments that are equivalent are contemplated as well, and the present invention is not limited to any of the particular approaches illustrated herein.

---

If the Serving_Grant has the value "Zero_Grant" or all processes are deactivated on both carriers:
    RRC may also configure MAC with periodic Scheduling Information triggering. The periodic trigger timer T_SING (Timer Scheduling Information - "Zero_Grant") is started once the Serving_Grant variable becomes "Zero_Grant" or all processes are deactivated on bother carriers and TEBS is larger than zero.
    When T_SING expires, the transmission of a Scheduling Information is triggered on both carriers.
    T_SING is restarted when the transmission of a Scheduling Information is triggered.
    T_SING is stopped and reset once the Serving_Grant variable of either carrier in the Serving Grant Update function takes a value other than "Zero_Grant" and at least one process is activated on that carrier.
Triggering when SG <> "Zero_Grant" on at least one carrier and at least one process is activated on that carrier:
    RRC may configure MAC with periodic triggering also for the case when the variable Serving_Grant <> "Zero_Grant" on at least one carrier and at least one process is activated on that carrier. The periodic trigger timer T_SIG (Timer Scheduling Information - different from "Zero_Grant") can be configured to a different value than T_SING.
    T_SIG is started once the Serving_Grant variable becomes <> "Zero_Grant" on at least one carrier and at least one process is activated on that carrier.
    When T_SIG expires, the transmission of a new Scheduling Information is triggered on both carriers.
    T_SIG is stopped and reset once the Serving_Grant variable on both carriers in the Serving Grant Update function becomes equal to "Zero_Grant" or all processes are deactivated on both carriers.
T_SIG is restarted when the transmission of a Scheduling Information is triggered.

---

(5) The WTRU may not transmit SI type S or SI type AS when the grant associated to the supplementary carrier is zero. Optionally, this condition may only be applied to periodic SI triggering or alternatively to non-periodic SI triggering.

(6) The WTRU may trigger transmission of SI(s), for example either SI type S and/or SI type A and/or SI type AS, when a certain configured condition on the power headroom for the anchor and/or supplementary uplink carrier is reached. For instance, one or more of the following conditions may be used as a trigger: when $UPH_S$ becomes larger or smaller than $UPH_A$ by a given threshold, when $UPH_S$ becomes larger or smaller than a given threshold, when $UPH_A$ becomes smaller than a given threshold and $UPH_S$ is larger than a given threshold, when $UPH_S$ becomes smaller than a given threshold and $UPH_A$ is larger than a given threshold, and/or when the difference between $UPH_A$ and $UPH_S$ becomes larger or smaller than a given threshold, when $UPH_S$ falls below a configured threshold, when $UPH_A$ falls below a configured threshold, when both $UPH_S$ and $UPH_A$ fall below configured threshold, and/or when UPH goes above a configured threshold (this may be useful if the conditions on the UPH have been changed and the WTRU has additional headroom and does not need to be disabled, for instance, when $UPH_S$ goes above a configured threshold, when $UPH_A$ goes above a configured threshold, when both $UPH_S$ and $UPH_A$ go above a configured threshold). Optionally, the above conditions may be considered to be met if the above conditions last for a given period of time.

(7) SI transmission may be conditional on UPH and grant. The WTRU may transmit SI type A or SI type AS when $UPH_A$ becomes larger than $UPH_S$ by a pre-defined or configured threshold and the grant on the anchor carrier is smaller than the grant on the supplementary carrier by a pre-defined or configured threshold. Similarly, the WTRU may transmit SI type S or SI type AS when $UPH_S$ becomes larger than $UPH_A$ by a pre-defined or configured threshold and the grant on the supplementary carrier is smaller than the grant on the anchor carrier by a pre-defined or configured threshold. Alternatively, the SI transmission may be conditioned on that the absolute UPH conditions are above or below a threshold and/or the grant on the primary or secondary carrier are above a threshold.

(8) The SI transmission may be conditional on UPH and deactivated HARQ processes. The WTRU may transmit SI type A or SI type AS when $UPH_A$ becomes larger than $UPH_S$ by a pre-defined or configured threshold and no HARQ processes are activated on the anchor carrier. Similarly, the WTRU may transmit SI type S or SI type AS when $UPH_S$ becomes larger than $UPH_A$ by a pre-defined or configured threshold and no HARQ processes are activated on the supplementary carrier.

The above conditional rules (7) and (8) may also be combined to create a set of conditional rules based on the UPH and deactivated HARQ processes or grant.

(9) Transmission of the SI type S or SI type AS may be conditional on a combination of the buffer status, the current grant and configured parameters such as the Happy_Bit_Delay_Condition. For instance, the WTRU may only transmit SI type S or SI type AS whenever the current grant situation does not allow the WTRU to empty its buffer within the configured time (e.g., Happy_Bit_Delay_Condition). This condition may apply only to a subset of the SI type S and SI type AS trigger mechanisms (e.g., it applies only to periodic or alternatively non-periodic SI triggers).

(10) The SI transmission may be conditional based on TEBS. If the WTRU has a non-zero grant on the anchor carrier and at least one active HARQ process on the anchor carrier and if the TEBS becomes larger than a pre-defined or configured threshold, and the supplementary carrier has zero grant or all HARQ processes on the supplementary carrier are deactivated, the WTRU may transmit an SI type S or SI type AS and/or SI type A. If the WTRU has a non-zero grant on the anchor carrier and at least one active HARQ process on the anchor carrier and if the supplementary carrier has zero grant or all HARQ processes on the supplementary carrier are deactivated and the WTRU is fully utilizing its grant or available power headroom on the anchor carrier, the WTRU may transmit an SI type S or SI type AS and/or SI type A. Alternatively, if the WTRU has a non-zero grant on the anchor carrier and at least one active HARQ process on the anchor carrier and if the supplementary carrier has zero grant or all HARQ processes on the supplementary carrier are deactivated and if the time it would take to empty the transmission buffer given the current grant, HARQ power offset and ratio of active HARQ processes is longer than a configured value, then the WTRU may transmit an SI type S or SI type AS and/or SI type A. Optionally, if the WTRU has a non-zero grant on the anchor carrier and at least one active HARQ process on the anchor carrier and if the WTRU is power-limited in the anchor carrier but not on the supplementary carrier, the SI is triggered for the above 2 conditions. It should be understood that the above conditions are equally applicable for the opposite cases, i.e., interchanging the conditions for anchor and supplementary carriers. In an alternate embodiment, the SI may be triggered if the TEBS becomes larger than or equal to a predefined threshold. Alternatively, the SI may also be triggered if the TEBS becomes lower than a predefined threshold. It is understood that the SI may be triggered on both carriers when any of these conditions are met, or alternatively, it may be triggered only on the carrier for which the conditions were met.

Alternatively, if the UPH on either carrier becomes above or below a threshold and the TEBS becomes above or below a threshold, the WTRU may transmit SI type A, SI type S, or SI type AS. Alternatively, if the UPH on the supplementary carrier become above a threshold, the WTRU may trigger the transmission of an SI.

(11) If an E-DCH serving cell change occurs and the new E-DCH serving cell was not part of the previous serving E-DCH radio link set (RLS), and if both uplink carriers have a non-zero grant and at least one HARQ process per carrier is activated, the WTRU may transmit SI type AS, or SI type A and SI type S possibly at some later point in time (pre-defined or configured by the network). If only the anchor carrier has a non-zero grant and at least one HARQ process is activated, then the WTRU may transmit SI type A. If only the supplementary carrier has a non-zero grant and at least one HARQ process is activated, then the WTRU may transmit SI type AS (if supported) or SI type S.

(12) If both uplink carriers have zero grant or none of the HARQ processes are activated, and if the TEBS becomes non-zero or if data with higher priority than the data contained in the transmission buffer arrives, the WTRU may transmit only SI type A. Alternatively, the WTRU may transmit only SI type S. Alternatively, the WTRU may transmit only SI type AS. Alternatively, the WTRU may transmit SI type A and SI type S possibly at some later point in time (pre-defined or configured by the network).

(13) The transmission of the SI may also be conditional on the WTRU ability to transmit a certain transport block size or E-TFCI. For example, the WTRU may be configured with a special E-TFCI value E-TFCIthresh. If the E-TFCIthresh is in a supported state for a configured period of time, or alternatively if the E-TFCIthresh is in a blocked state for a configured period of time, the WTRU may transmit an SI.

(14) The transmission of the SI may be conditional on the Normalized Remaining Power Margin (NRPM) being above or below or threshold, optionally for a predefined period of time.

Optionally, for all the conditions disclosed above, the triggering conditions described above may need to persist for a predefined or configured amount of time for the SI to be triggered.

It should be understood that when referring to transmitting only SI type A throughout this disclosure, the WTRU may also transmit SI type AS or S with the $UPH_S$ field set to zero. This would allow a constant SI format to be sent in all scenarios, even when the secondary carrier is deactivated. Even though some of the triggers to sent SI type S are described, it should be noted that when this conditions are met and the WTRU triggers the SI type S, the WTRU may also send SI type A, or alternatively, the triggers between the two carriers may be independent.

These rules may be applied in any combination and may depend on whether or not the WTRU supports SI type S and SI type AS together. For example, a WTRU may only support one of the two types. Although these triggers apply to the SI, they may also apply to higher layer measurements (e.g., events 6x) or any other type measurement identity that may be introduced for these purposes. For example, when one or more of the above condition or trigger is met, the WTRU transmits an RRC MEASUREMENT REPORT.

The WTRU may be configured with UPH threshold value, a TEBS threshold value, an E-TFCI threshold value, and optionally a time value by the network. When the UPH is larger than the configured UPH threshold value, the TEBS is larger than the configured TEBS threshold value and an E-TFCI corresponding to the configured E-TFCI threshold value is in a supported state for a configured period of time, the WTRU may transmit an SI. Alternatively, the WTRU may transmit a MEASUREMENT REPORT when these conditions are met. This mechanism may allow the WTRU to indicate grant or bandwidth limited conditions to the network. Optionally, this trigger only applies when the secondary carrier is de-activated. This trigger may apply only to the anchor carrier.

Alternatively or in addition, when the UPH is smaller than the configured UPH threshold value, the TEBS is larger than the configured TEBS threshold value and an E-TFCI corresponding to the configured E-TFCI threshold value is in a blocked state for a configured period of time, the WTRU may transmit an SI. Alternatively, the WTRU may transmit a MEASUREMENT REPORT when these conditions are met. This mechanism may allow the WTRU to indicate power-limited conditions to the network. Optionally, this trigger only applies when the secondary carrier is activated. This trigger may apply only to the secondary carrier, or optionally to all active uplink carriers.

Embodiments for SI delivery are described hereafter.

Once SI reporting is triggered, either by an event or timer, or any other criteria listed above, a pair of UPHs are generated respectively for the two carriers, which need to be delivered to network by uplink transmission along with the buffer status information. From network scheduling perspective, these two UPH values may be required to be processed simultaneously or within a short period of time in order to attain meaningful power information pertaining to this particular WTRU.

In the cases where the two UPHs are placed in separate SIs for transmission, such as in the format of SI types A and S, they may not arrive at the network in the same time due to limitation or uncertainty of the physical channel resources. Thus, there is normally a variable delay from the time of the triggering to the time the network actually receives both UPH values. This delay may be caused, for example, by the fact that the current HARQ process of a given carrier may already be taken by the retransmission from a previous TTI data transmission, that the current HARQ process of a given carrier is deactivated by the network via E-AGCH, or restricted by RRC, or that many retransmissions are required due to difficult channel conditions, etc.

Certain level of delay may be tolerated due to the fact the UPH is a relatively slow statistics averaged over a certain time period. In accordance with one embodiment, a parameter is specified that defines the maximum duration within which the two SIs are required to be transmitted to the physical channels. This parameter may be either a counter (e.g., that counts the number of TTIs in the duration), or a timer (e.g., in terms of milliseconds). The parameter may be predefined or pre-configured by the network based on channel conditions and available physical channel resources. This parameter is denoted by T_SIMD hereafter.

Given that certain delay is allowed as specified by T_SIMD, a WTRU may take advantage of the possible presence of spare bits owing to the quantized size of the transport block, within which SI may be piggybacked to data to reduce overhead. In other words, when a physical channel resource becomes available, the WTRU does not necessarily transmit SI immediately. Instead, the WTRU may wait for a certain period until finding the most suitable TTI according to specified criteria that are designed to minimize the overhead under the delay constraint.

The criteria to determine the suitable TTI over a given carrier may be defined by one or any combinations of the following:

(1) There is sufficient space (e.g., 18 bits) left in the E-DCH transport block due to quantization of transport block size;

(2) The current HARQ process is not taken by the retransmission of a previously transmitted transport block;

(3) The current HARQ process is not deactivated by the network via E-AGCH or restricted by RRC;

(4) There is E-DCH data transmission in the TTI period; or (5) The carrier is not in DTX state.

At the time the SI reporting is triggered, either by event or timer, a pair of SIs may be generated with distinct UPHs. The SI carrying the UPH for anchor carrier is denoted by SI_A and the SI with the UPH for supplementary carrier is denoted by SI_S. With T_SIMD and the criteria being specified, there are a number of possible realizations by which the SIs can be delivered to network via uplink E-DCH transmission:

In accordance with one embodiment, SIs may be transmitted in only one carrier. At the first TTI period after the SI triggering, E-TFC selection is performed based on the power headroom and SG conditions on both carriers. Over the SI carrying carrier, if the criterion to send SI is met, the WTRU allocates a space and includes either SI_A or SI_S in the transport block. For example, either SI_A or SI_S may be included depending on whether current HARQ process is even or odd numbered. In case there is no matching SI for this HARQ process, no SI transmission will take place over this TTI. At the following TTI(s), the above procedure is repeated until all SIs are transmitted as long as a counter condition on T_SIMD is not reached. When the counter condition on T_SIMD is reached, the remaining SIs may be transmitted unconditionally at the last TTI periods regardless the criterion is met or not.

In accordance with another embodiment, the SIs are transmitted via two carriers. The SIs may be transmitted on the carriers corresponding to their respective UPH measurement they are carrying. With this scheme, there is no need for additional means to identify the SIs as the carrier over which the SI is located implies which UPH it is supposed to carry. At the first TTI period after the SI triggering, E-TFC selection is performed based on the power headroom (such as UPH) and SG conditions on both carriers. If the criterion is met on anchor carrier, space is allocated and SI_A is included in the transport block on the anchor carrier. If the criterion is met on supplementary carrier, space is allocated and SI_S is included in the transport block on the supplementary carrier. If any of the two SIs is not transmitted because the criterion is not met, the above procedure is repeated for the following TTI(s) until all SIs are transmitted as far as a counter condition on T_SIMD is not reached. When the counter condition on T_SIMD is reached, the rest of SIs may be transmitted unconditionally at the last TTI period regardless the criterion is met or not.

In accordance with another embodiment, SIs may be transmitted dynamically across two carriers based on availability of the physical channel resources. For the first TTI after the SI triggering, a first carrier is selected and E-TFC selection is performed on the selected carrier based on the UPH and SG conditions. If the criterion to send SI is met on this carrier, space is allocated and either SI_A or SI_S is included in the transport block over this carrier. For example, either SI_A or SI_S may be included depending on whether current HARQ process is even or odd numbered. This serves as a means of identifying SI types. In case there is no matching SI left for this HARQ process, no SI transmission will take place over this TTI even the criterion is met. The above procedure is repeated for the other carrier in the same TTI.

If any of the two SIs is not transmitted because of the criterion is not met, the above procedure is repeated until all SIs are transmitted as far as a counter condition on T_SIMD is not reached. When the counter condition on T_SIMD is reached, the rest of SIs may be transmitted unconditionally at the last TTI period regardless the criterion is met or not.

Although the above embodiments for the SI delivery are described under the context of dual carrier operation, it should be noted that the same approaches may be generalized to the case of multiple carriers.

To support the higher uplink data rates, a larger E-DCH transmission buffer may be used. For example, a WTRU configured with dual-carrier HSUPA may also need to double the E-DCH buffer size. In this context, the values in the TEBS tables may be increased to reflect the larger E-DCH buffer size.

In one embodiment, when the WTRU is configured with dual-carrier HSUPA, the TEBS values may point to a different mapping table (pre-defined or configured by the network). Alternatively, when the WTRU is configured with dual-carrier HSUPA, the values in the TEBS table may be modified according to a given rule (e.g., the values are all multiplied by a given factor). Alternatively, the mapping tables used may depend on the type of SI transmitted. The same scheme may be applied to the HLBS table and values.

Figure 5:
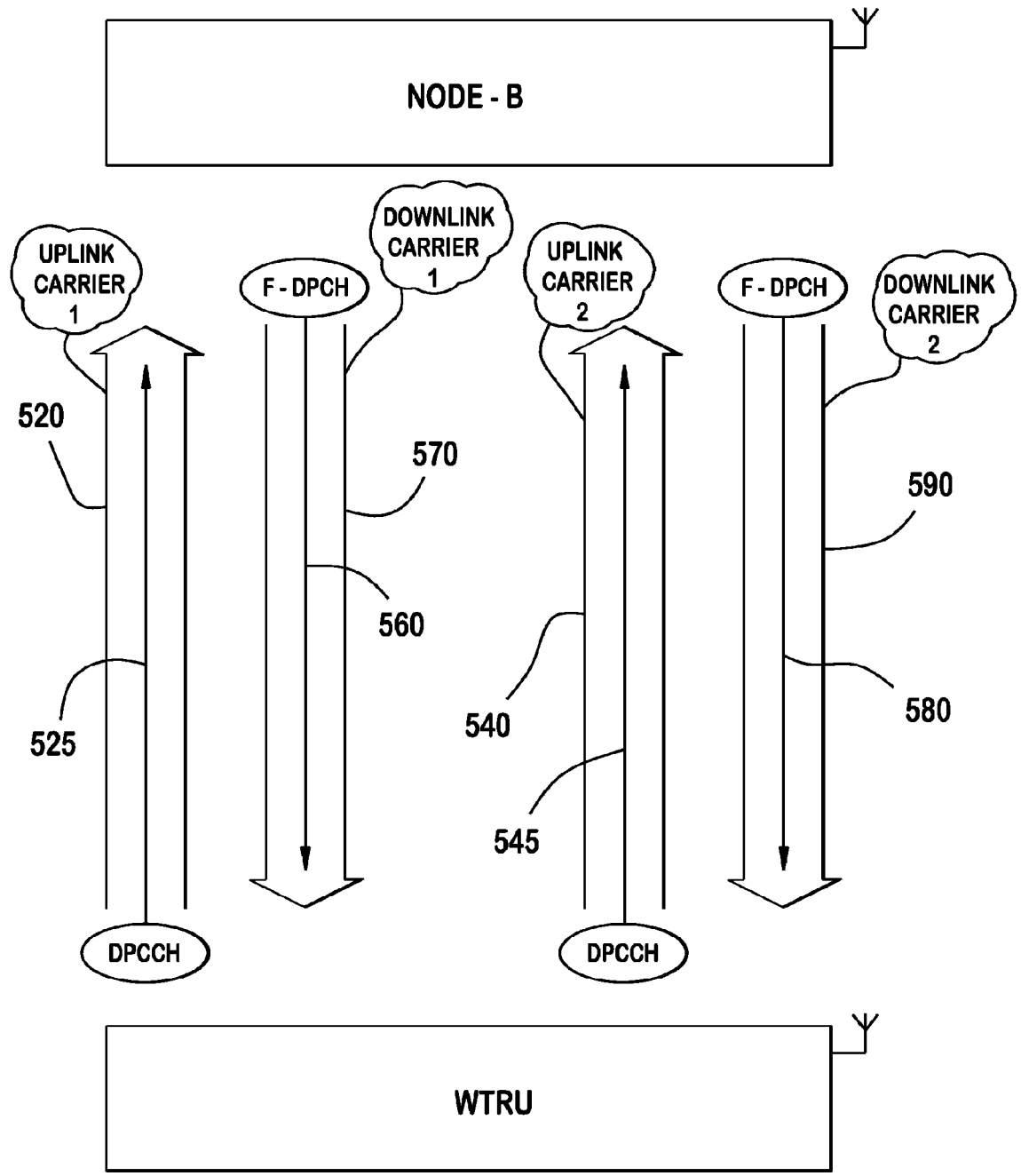
FIG. 5 is a functional block diagram wherein two uplink carriers are controlled by transmit power control (TPC) commands transmitted to a WTRU on two downlink carriers.

Referring now to FIG. 5, embodiments to perform power control on both uplink carriers 520, 540 (i.e., in a dual-carrier scenario) and allocate power and data across the uplink carriers are described hereafter. It is noted that while specific channels are shown being carried by uplink and downlink carriers in FIGS. 5-7 and FIG. 9, any channels may be carried in such carriers.

In accordance with one embodiment, the transmission powers of the uplink dedicated physical control channel (DPCCH) transmissions 525, 545 on both uplink carriers 520, 540 are controlled by two separate transmit power control (TPC) commands transmitted by the Node-B. One TPC command controls the power of the first uplink carrier 520 and the other TPC command controls the power of the second uplink carrier 540. The WTRU varies the power of the DPCCH 525, 545 on each uplink carrier 520, 540 based on the corresponding TPC command A Node-B may transmit a TPC command for an uplink carrier over an F-DPCH 560, 580 on a downlink carrier 570, 590 corresponding to that uplink carrier 520, 540 respectively. A mapping between the uplink carrier and the downlink carrier may be pre-defined. The WTRU typically obtains the TPC commands by listening to two channels (e.g., F-DPCH) transmitted over two different downlink carriers, but of course different channels may be used for transmitting such commands.

Figure 6:
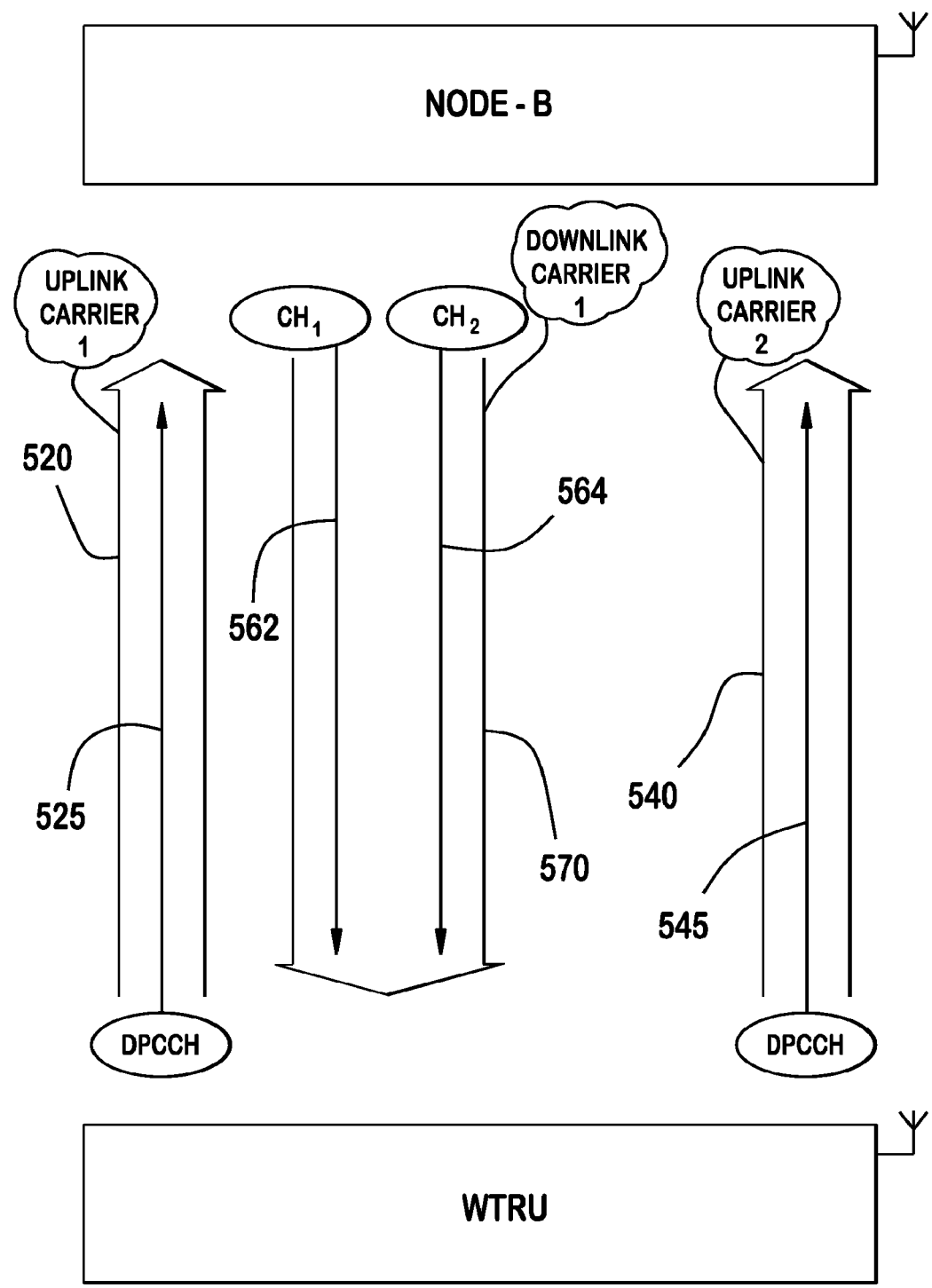
FIGS. 6 and 7 are functional block diagrams wherein two uplink carriers are controlled by transmit power control (TPC) commands transmitted to a WTRU on a single downlink carrier.

Alternatively, referring now to FIG. 6, the TPC commands for the two uplink carriers 520, 540 may be transmitted on two different channels 562, 564 on the same downlink carrier 570 (either one of the downlink carriers 570 or 590 may be used, but 570 is shown as being used in this embodiment). In this embodiment, the WTRU is not required to listen to both downlink carriers 570 and 590 if there is no other activity on at least one of the downlink carriers.

Figure 7:
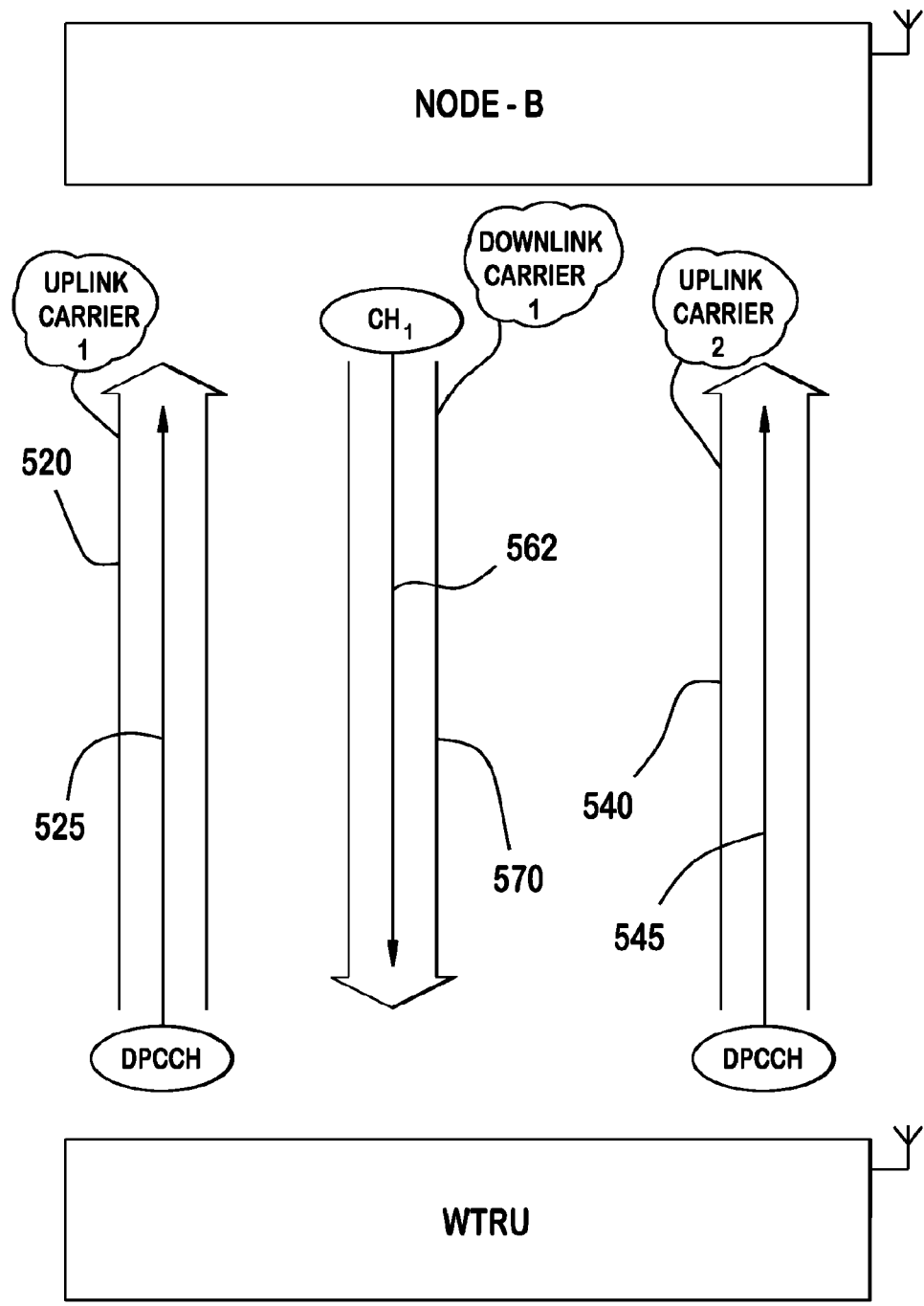
Figure 8:
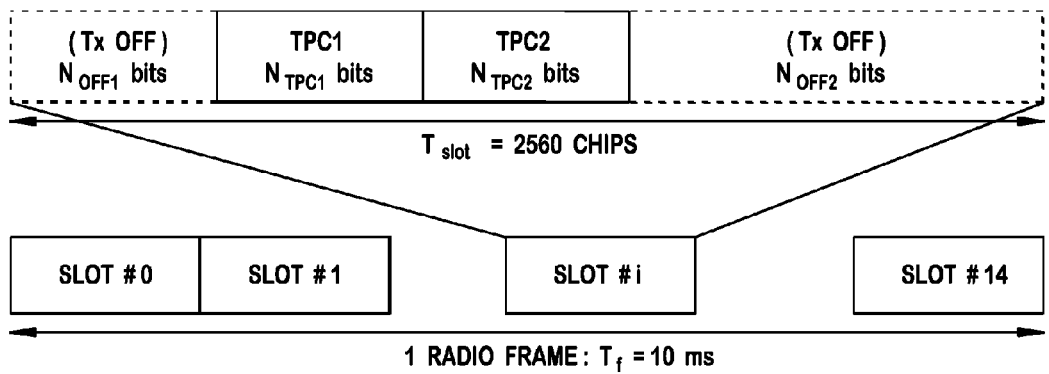
FIG. 8 shows an example F-DPCH slot format in accordance with one embodiment.

In a further alternative embodiment, shown in FIG. 7, the TPC commands for the two uplink carriers 520, 540 may be carried over a single channel 562 (e.g., F-DPCH) in a single downlink carrier 570 (again, either one of the downlink carriers 570 or 590 may be used, but 570 is shown as being used in this embodiment). FIG. 8 shows an example F-DPCH slot format in accordance with this alternative embodiment. An F-DPCH slot format includes two TPC fields per slot, where TPC1 and TCP2 each contain a power control command (UP or DOWN) for uplink carrier 1 and uplink carrier 2, respectively.

Referring again to FIG. 7, in another alternative embodiment, power control commands for both uplink carriers are transmitted on a single channel 562 such as the F-DPCH channel, the power control commands are time multiplexed. The time-multiplexing of power control commands may be achieved in a number of different ways. The power control commands may evenly alternate between uplink carrier 1 520 and uplink carrier 2 540. For example, the uplink carrier for which the power control command is destined may be determined as:

If (current connection frame number (CFN)+slot number) modulo 2=0, then TPC is for uplink carrier 1;
Else, TPC is for uplink carrier 2.

For example, power control commands for uplink carrier 1 520 may be carried in radio slots #0, 2, 4, 6, 8, 10, 12, and 14; whereas power control commands for uplink carrier 2 540 may be carried in radio slots #1, 3, 5, 7, 9, 11, and 13, or vice versa. Alternatively, more power control commands may be allocated to uplink carrier 1 520 than uplink carrier 2 540. For example, power control commands for uplink carrier 1 520 may be carried in radio slots #0, 1, 3, 4, 6, 7, 9, 10, 12, and 13, whereas power control commands for uplink carrier 2 540 may be carried in radio slots #2, 5, 8, 11, and 14. This alternative may be used if there is a reason why providing more power control commands will increase overall efficiency. Such a scenario may be, for example, where uplink carrier 1 520 is carrying more physical layer channels than uplink carrier 2 540.

Synchronization may also be defined on a per-carrier basis. The WTRU may apply the synchronization procedure on both carriers separately. The WTRU may be allowed to transmit on a carrier depending on the synchronization status on that carrier. Radio link failure may be declared upon loss of synchronization on both carriers.

Still referring to FIG. 7, in yet another alternative of the scenario where power control commands for both uplink carriers are transmitted on a single channel 562 such as the F-DPCH, the transmission powers of the DPCCH transmissions on both uplink carriers may be controlled by a single TPC command transmitted by the Node-B on, in this scenario, the F-DPCH. When the TPC command from the Node-B indicates to increase the power, the power is (e.g., equally) increased on both uplink carriers, and when the TPC command indicates to decrease the power, the power is (e.g., equally) decreased on both uplink carriers. For example, the power control commands may be joint-coded into a single TPC field. Example joint coding of the TPC commands is shown in Table 1 for $N_{TPC}=2$ and $N_{TPC}=4$, where $N_{TPC}$ is the number of TPC command bits.

TABLE 1

| TPC Bit Pattern | | TPC Command | |
|---|---|---|---|
| $N_{TPC} = 2$ | $N_{TPC} = 4$ | Uplink Carrier 1 | Uplink Carrier 2 |
| 00 | 0000 | 0 | 0 |
| 01 | 0011 | 0 | 1 |
| 10 | 1100 | 1 | 0 |
| 11 | 1111 | 1 | 1 |

Figure 9:
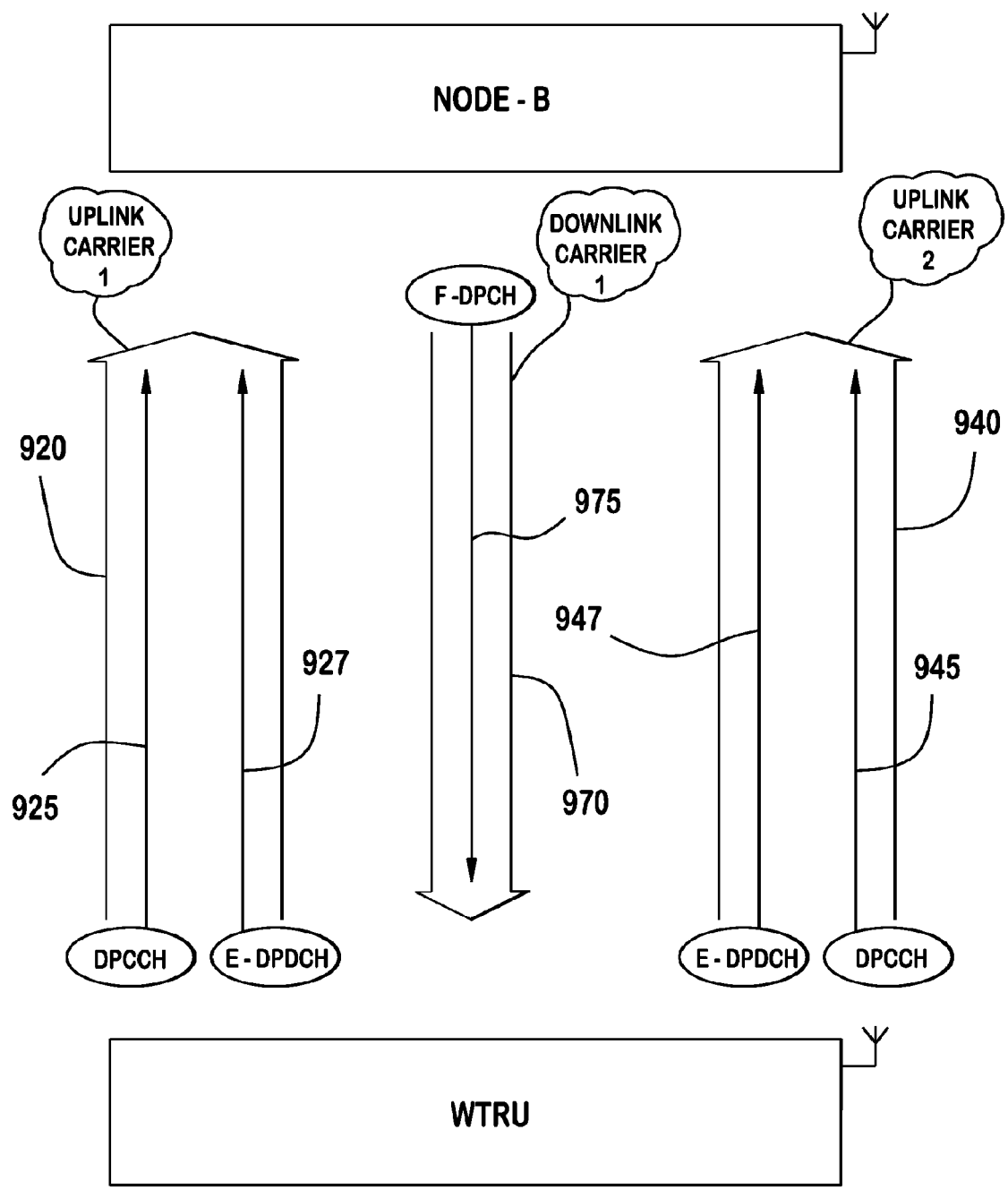
FIG. 9 is a functional block diagrams wherein transmit power control (TPC) commands are sent in the uplink in a multiple uplink carrier environment.

Referring now to FIG. 9, the following embodiments are in relation to the uplink transmission of transmit power control (TPC) commands from the WTRU to the Node-B on the uplink DPCCH for purposes of downlink power control. The WTRU may transmit a TPC command on the uplink DPCCH 925 of only one of the uplink carriers (in this example 920). On another uplink carrier (in this case 940), the WTRU may use either discontinuous transmission (DTX) in place of transmitting the TPC bits, or a new slot format with no TPC field. The TPC command may be derived from the quality measured on the downlink carrier 970 on which a downlink channel such as, for example, the F-DPCH 975 is transmitted. This approach has an advantage of somewhat reducing the interference from the WTRU. The WTRU may transmit the uplink DPCCH 925, 945 with only the pilot bits used for channel estimation by the Node-B.

Alternatively, the WTRU may transmit the same TPC command on the uplink DPCCH 925, 945 of both uplink carriers 920, 940. The TPC command may be derived from the quality measured on the downlink carrier 970 on which the F-DPCH 975 is transmitted. The Node-B may combine the TPC command signals from the two uplink DPCCHs 925, 945 to improve reliability of the TPC signals from the WTRU.

Alternatively, the WTRU may transmit independent TPC commands on the uplink DPCCH 925, 945 of each uplink carrier 920, 940. In this case, the TPC command sent on an uplink carrier 920, 940 may be derived based on the signal quality measured from the corresponding downlink carrier(s) (not shown) independently of the downlink carrier on which the F-DPCH 970 is transmitted. This scheme has the benefit of providing the network with some additional information regarding the downlink channel.

Since the uplink channels 925, 927, 945 on the two uplink carriers may not behave the same, it is possible that the channel quality changes on one carrier 920 differently than on another carrier 940. It is also possible that the channel quality on one carrier 920 changes whereas channel quality does not change on another carrier 940. In one example, channel quality degrades on one uplink carrier 920 while it improves on the other uplink carrier 940. In this case the Node-B has different options for setting the value of the TPC bits on the F-DPCH 975. The Node-B may set the TPC bit to "up" whenever the quality from one of the carriers 920, 940 is below a threshold, and "down" otherwise. This option may result in the uplink DPCCH power being high on one of the carriers 920, 940 making channel estimation easier for the Node-B. Alternatively, the Node-B may set the TPC bit to "down" whenever the quality from one of the carriers 920, 940 is above a threshold, and "up" otherwise. This option may result in the uplink DPCCH 925, 945 power being lower than a threshold for one of the carriers 920, 940 so the Node-B may derive an acceptable channel estimate on this carrier using the information from the other carrier.

If the average uplink interference (noise rise) level is not the same on both uplink carriers 920, 940, there may be a long-term and significant discrepancy in channel quality between the uplink carriers. The WTRU may apply an offset to the transmission power of one of the uplink carriers (e.g., 920) compared to the other uplink carrier (e.g., 940). This offset may be signaled by the network via higher layer signaling, (e.g., RRC signaling), or the like. The network may set the offset so that the average signal quality from both uplink carriers 920, 940 would be the same or similar.

The network may define different sets of reference E-DCH transport format combination index (E-TFCI) and corresponding gain factors for the two uplink carriers 920, 940, so that the signal-to-interference ratio (SIR) of the E-DPDCH 927, 947 (which contains data bits) is approximately the same on both uplink carriers 920, 940. For instance, if the DPCCH SIR of uplink carrier 1 920 is −22 dB in average while the DPCCH SIR of uplink carrier 2 940 is −19 dB in average, setting a reference gain factor 3 dB lower for uplink carrier 2 (for the same reference E-TFCI) would result in approximately the same E-DPDCH SIR for both uplink carriers 920, 940 and a given E-TFC (the reference gain factor of uplink carrier 2 940 may actually be set slightly lower than 3 dB below uplink carrier 1 920 given the better channel estimate with uplink carrier 2 940).

Synchronization may be defined on a per-carrier basis. The WTRU may apply the synchronization procedure on both carriers separately. The WTRU may be allowed to transmit on a carrier depending on the synchronization status on that carrier. Radio link failure may be declared upon loss of synchronization on both carriers.

Still referring to FIG. 9, embodiments for E-TFC restriction and selection are described hereafter. A WTRU transmission may be restricted by a maximum allowed transmit power. The maximum allowed transmit power of the WTRU may be a minimum of a signaled configured value and a maximum power allowed due to WTRU design limitation. The maximum allowed transmit power of the WTRU may be configured as a total maximum power in a given transmission time interval (TTI) for both uplink carriers 920, 940, or may be carrier-specific. In the latter case, the same maximum power value may be assigned to each uplink carrier 920, 940 or a different maximum power value may be assigned to each uplink carrier 920, 940. This may depend on the particular configuration of the device, (e.g., the number of power amplifiers and antennas of the WTRU), and/or on network control and configuration. The total maximum transmit power and the per-carrier maximum transmit power may be simultaneously configured.

The WTRU behavior and operation may be quite different in both cases (i.e., one total maximum transmit power or independent per-carrier maximum transmit power). Therefore, the WTRU may indicate the power capabilities of the WTRU, (i.e., one maximum power or a maximum power defined per carrier), to the network so that the network knows whether the WTRU has a total maximum power for both uplink carriers 920, 940 or a carrier-specific maximum power for each uplink carrier 920, 940, and may schedule operations and correctly interpret the uplink power headroom reported by the WTRU. If the power requirements are specified in the standards the WTRU may not need to signal these capabilities.

Figure 10:
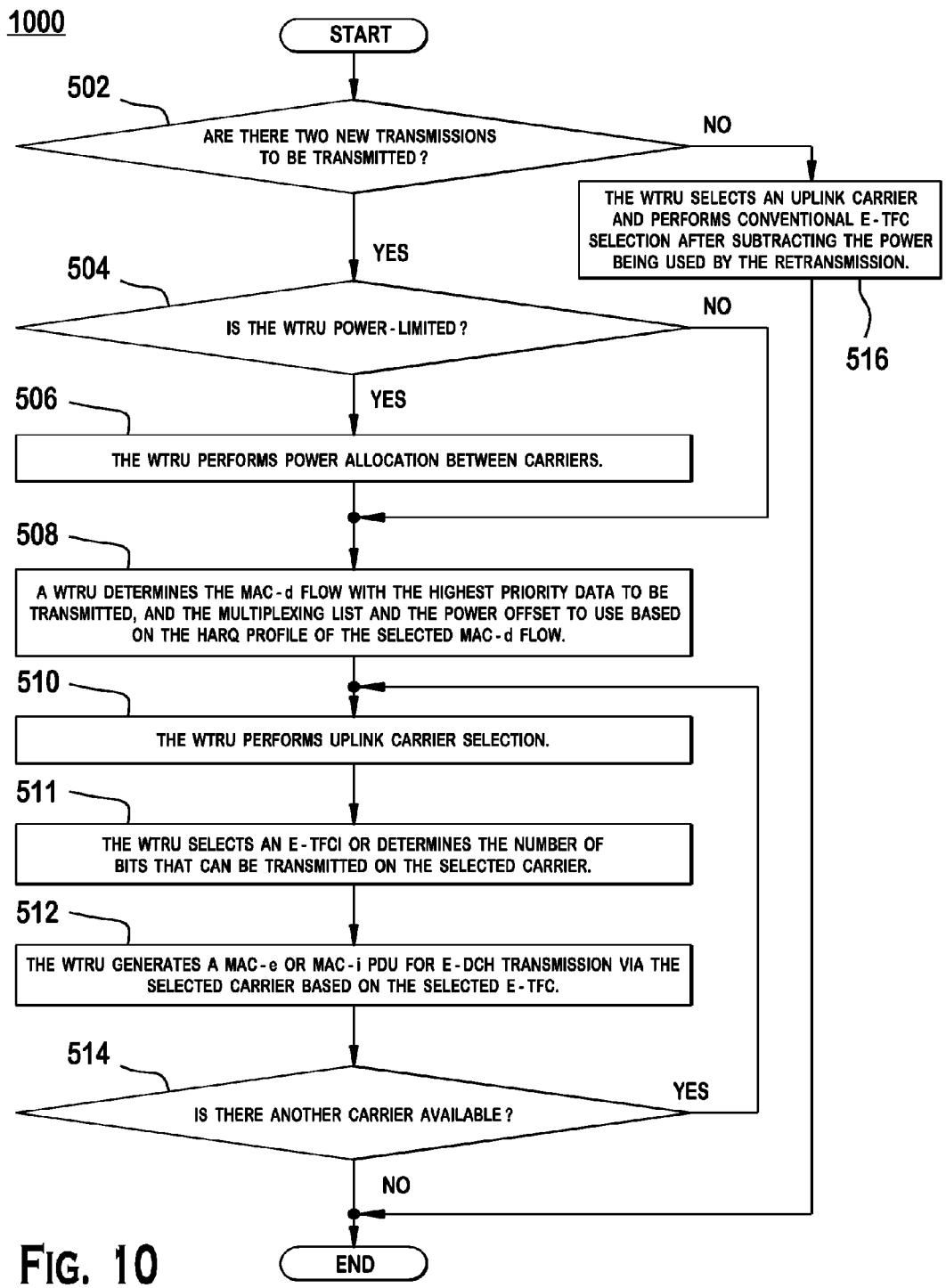
FIG. 10 is a flow diagram of an example process for E-TFC selection and MAC-e or MAC-i PDU generation while utilizing two uplink carriers.

FIG. 10 is a flow diagram of an example process 1000 for E-TFC selection and MAC-i PDU generation while utilizing two uplink carriers is shown. As mentioned above, specific terms for referring to the carriers are used interchangeably herein, but it is noted that in an HSPA+ type system, the two carriers may be referred to as an anchor (or primary) carrier and a supplementary (or secondary) carrier and these terms will be used for convenience in describing FIG. 10. A WTRU determines whether there are two (N in general, N being an integer larger than one) new transmissions to be transmitted for the upcoming TTI (step 502). If there is one new transmission for the upcoming TTI, (e.g., there are one new transmission and one retransmission of the previous failed transmission), the WTRU selects an uplink carrier (the carrier for the new transmission) for E-TFC selection and performs an E-TFC selection procedure for the new transmission while the supported E-TFCIs for the new transmission are determined after subtracting the power being used by the retransmission (step 516). If there are two new transmissions to be transmitted, the WTRU determines whether the WTRU is power limited, (i.e., sum of the total power that would be used by the WTRU in each carrier given the grants (scheduled and non-scheduled) and control channels exceed the maximum power allowed by the WTRU, optionally including backoff) (step 504). If not, the process 500 proceeds to step 508. If so, the WTRU performs power allocation between the uplink carriers (step 506). Alternatively, the WTRU may proceed to step 506 for power allocation between the carriers without checking if the WTRU is power limited. Once power allocation is performed the WTRU fills up the transport blocks sequentially one carrier after the other.

The WTRU determines the MAC-d flow with the highest priority data to be transmitted, and the multiplexing list and the power offset to use based on the HARQ profile of the selected MAC-d flow (step 508). When determining the highest priority MAC-d flow the WTRU may, for every carrier, determine the highest priority MAC-d flow configured with data available amongst all MAC-d flows. In an alternate embodiment, the WTRU may, for every carrier for which E-TFC selection or highest priority MAC-d flow selection is being performed, determine the highest priority MAC-d flow amongst all MAC-d flows allowed to be transmitted on the given carrier. The WTRU performs an uplink carrier selection procedure to select an uplink carrier among a plurality of uplink carriers to fill up with data first (step 510). It should be noted that the steps of carrier selection, MAC-d flow determination may not necessarily be performed in the order described, but may be performed in any order). The WTRU selects an E-TFCI or determines the number of bits that can be transmitted on the selected carrier based on a maximum supported payload (i.e., set of supported E-TFCIs), a remaining scheduled grant payload, a remaining non-scheduled grant payload, data availability and logical channel priorities (step 511).

The WTRU generates a MAC-e or MAC-i PDU for E-DCH transmission via the selected carrier based on the selected E-TFC (step 512). If scheduling information (SI) needs to be sent for the selected carrier, the WTRU may initially include the SI on this carrier before including any other data. Once the WTRU has completed the available space on the selected carrier or has exceeded the data in the buffer allowed to be transmitted in the TTI, the WTRU determines whether there is another uplink carrier available and data is still available (step 514). If not, the process 500 ends. If so, the process 500 returns to step 510 (or alternatively to step 508) to select the E-TFCI of the next carrier.

At this point, (in step 508), the WTRU may optionally re-determine the highest priority MAC-d flow that has data to be transmitted. The re-selected highest priority MAC-d flow may be different than the one determined initially before filling up the previously selected carrier. If a new highest MAC-d flow is selected, the WTRU determines the power offset based on the HARQ profile of the newly selected MAC-d flow, and may then determine the maximum supported payload (or set of supported E-TFCs) and remaining scheduled grant payload according to the new power offset. Alternatively, the WTRU may determine the MAC-d flow priority only once at the beginning of the procedure (e.g., step 508) and apply the selected HARQ profile and multiplexing list to both carriers. This implies that the WTRU determines the maximum supported payload (or supported E-TFCs and remaining scheduled payload) for both carriers either simultaneously in parallel or only at the time these values are needed according to E-TFC selection sequence. In this case for the second selected carrier the WTRU may return to step 510. It should be noted that the process 500 is applicable to the case that more than two uplink carriers are utilized.

Details of the power allocation, carrier selection, and E-TFC restriction and selection will be explained below.

The maximum supported payload refers to the maximum allowed number of bits that may be transmitted based on the available power for any uplink carrier. This, as an example, may also be referred to as the maximum supported E-TFCI. The maximum supported payload or the set of supported or blocked E-TFCIs, for example in HSPA systems are determined as part of the E-TFC restriction procedure and may be dependent on the selected HARQ offset. Additionally, the set of supported E-TFCI may also be dependent on the minimum set E-TFCI. Embodiments for E-TFC restriction and determination of supported/blocked E-TFCI are described below.

Where referred to hereafter, a MAC-d flow may also refer to a logical channel, a group of logical channels, a data flow, a data stream, or data service or any MAC flow, application flow, etc. All the concepts described herein are equally applicable to other data flows. For example in HSPA system for E-DCH, each MAC-d flow is associated to a logical channel (e.g., there is a one-to-one mapping) and has a priority from 1 to 8 associated to it.

Generally, there are scheduling mechanisms used for uplink transmissions and data transmissions. The scheduling mechanisms may be defined by the quality of service (QoS) requirements and/or the priority of the data streams to be transmitted. Depending of QoS and/or priority of the data streams, some of the data streams may or may not be allowed to be multiplexed and transmitted together in one TTI. Generally, data flows and streams can be grouped in best effort or non real time services and guaranteed bit rate service with some strict delay requirements. In order to meet QoS requirements different scheduling mechanisms are used, some dynamic in nature and some less dynamic.

Generally, wireless systems, such as LTE and high speed uplink packet access (HSUPA), operate on a request-grant basis where WTRUs request a permission to send data, via uplink feedback, and the Node-B (eNB) scheduler and/or RNC decides when and how many WTRUs will be allowed to do so. Hereafter, this is referred to as scheduled mode transmissions. For example in HSPA systems, a request for transmission includes indication of the amount of buffered data in the WTRU and WTRU's available power margin (i.e., UE power headroom (UPH)). The power that may be used for the scheduled transmissions is controlled dynamically by the Node-B through absolute grant and relative grant.

For some data streams with strict delay requirements and guaranteed bit rate, such as voice over IP (VoIP) or signaling radio bearers or any other service that need to meet these requirements, the network may ensure the timely delivery of such transmissions via special scheduling mechanisms that are less dynamic in nature and allow the WTRUs to transmit data from a particular flow on at pre-scheduled time periods, resources, and up to a configured data rate. These flows in some systems such as HSPA for example are referred to as non-scheduled flows. In other systems, such as LTE. they may be referred to as semi-persistent scheduling and flows. Even though the embodiments described herein are described in terms of scheduled and non-scheduled data, it should be understood that they are equally applicable to other systems that use similar scheduling procedure and distinctions between data flows.

Dynamic scheduling, where control channels are used to allocate the resources for certain transmissions and for the possible retransmissions, gives full flexibility for optimizing resource allocation. However, it requires control channel capacity. In order to avoid control channel limitation problem, semi-persistent scheduling (SPS) may be used in systems such as LTE and non-scheduled transmission in systems such as UMTS. Flows that use dynamic scheduling or the dynamic grant-based mechanism (e.g., via physical channel control signaling) will be referred to as scheduled transmissions. Data streams that use a more semi-static and periodic allocation of resources will be referred to as non-scheduled transmissions.

For example, in HSPA, each MAC-d flow is configured to use either scheduled or non-scheduled modes of transmissions, and the WTRU adjusts the data rate for scheduled and non-scheduled flows independently. The maximum data rate of each non-scheduled flow is configured by higher layers, and typically not changed frequently.

In the E-TFC selection procedure, the WTRU may also determine the remaining non-scheduled grant payload for each MAC-d flow with a non-scheduled grant, which refers to and correspond to the number of bits allowed to be transmitted according to the configured non-scheduled grant for the given MAC-d flow.

The remaining scheduled grant payload in the procedure above refers to the highest payload that could be transmitted according to the network allocated resources after power allocation for other channels. For example, a network allocated resource refers to the serving grant and selected power offset of the corresponding carrier for HSPA systems. The value of the serving grant used for calculating the remaining scheduled grant payloads for the uplink carriers may be based on the value of the actual serving grant allocated for the uplink carriers. Alternatively, as the remaining scheduled grant payload for the primary carrier and/or the secondary carrier may be based on the scaled or fictitious or virtual grant after power allocation is performed, the WTRU may use the "virtual" or "fictitious" or scaled serving grant to determine the remaining scheduled grant payload. The three terms may be used interchangeably and refer to the power allocation or power split for scheduled transmissions for each carrier. The scaling of the grants is described as part of the power allocation schemes below. Alternatively, if the WTRU is sharing one serving grant for both uplink carriers, (i.e., one serving grant is given for both uplink carriers), the WTRU may use half the serving grant for each uplink carrier. Alternatively, the WTRU may assume that all serving grant is being allocated to one uplink carrier when performing this calculation.

The non-scheduled grant may be carrier specific, (e.g., the configured non-scheduled grant value is assigned and configured for only one carrier, the carrier for which non-scheduled transmission is allowed). The carrier in which non-scheduled transmission is configured/allowed may be predetermined, (e.g., the non-scheduled transmission may be allowed only on the primary carrier or alternatively on the secondary carrier). Alternatively, it may be configured by the network dynamically. The value of non-scheduled grant may be carrier independent, in which case a total number is determined for both carriers.

Data flows may be configured to be carrier specific (e.g., network configures a flow and an associated carrier over which this flow may be transmitted). If data flows are carrier specific the WTRU may perform the E-TFC selection procedure independently for each carrier. The network may provide a non-scheduled grant based on a HARQ process that belongs to a carrier, or provide a non-scheduled grant that is applicable to a TTI, and the WTRU chooses a carrier.

Embodiments for selecting an uplink carrier for initial E-TFC selection are disclosed hereafter. The embodiments for carrier selection described below may be performed individually or in combination with any other embodiments disclosed herein. The procedures affecting the choice of the number of bits to be transmitted in each uplink carrier and the power to use in each uplink carrier, and the like are all dependent on which uplink carrier the WTRU selects and treats first.

In accordance with one embodiment, a WTRU may give priority to, and treat first, the anchor carrier. This may be desirable if non-scheduled transmissions are allowed on the anchor carrier. Alternatively, the secondary carrier may be given a priority and selected first.

Alternatively, the WTRU may determine the highest priority carrier to minimize inter-cell interference, maximize WTRU battery life, and/or provide the most efficient energy per bit transmission. More specifically, the WTRU may choose the uplink carrier that has the largest calculated carrier power headroom. The WTRU may base this determination on the current power headroom, (e.g., UE power headroom (UPH)) measurement for each carrier (UPH indicates the ratio of the maximum WTRU transmission power and the corresponding DPCCH code power) or on the results of the E-TFC restriction procedure, (e.g., normalized remaining power margin (NRPM) calculation for each carrier, or remaining power), which equivalently translates to the carrier with the lowest DPCCH power ($P_{DPCCH}$). For instance, the uplink carrier selection may be made in terms of the number of bits, (e.g., a priority may be given to the carrier which provides a greater "maximum supported payload" between the anchor carrier and the supplementary carrier). The maximum supported payload is the payload determined based on the remaining power (e.g., NRPM or other value disclosed below) of the WTRU.

Alternatively, the WTRU may give a priority to the uplink carrier which provides the WTRU with the largest available grant, which allows the WTRU to send the highest amount of data and possibly create the least number of PDUs and thus increase efficiency and reduce overhead. The WTRU may select a carrier based on the maximum value between the serving grant for the anchor carrier (SGa) and serving grant for the supplementary carrier (SGs).

Alternatively, the WTRU may provide a priority to the carrier that provides the greater "remaining scheduled grant payload" between the anchor carrier and the supplementary carrier. The remaining scheduled grant payload is the available payload determined based on the scheduling grant from the network and remaining after processing of the DCH and HS-DPCCH.

Alternatively, the WTRU may optimize between maximum power and maximum grant. More specifically, the WTRU may select a carrier that allows the highest number of bits to be transmitted. The WTRU determines the number of bits that may be transmitted for anchor carrier and supplementary carrier limited by both power and grant, (i.e., "available payload" for the anchor carrier and "available payload" for the supplementary carrier), and may select the carrier that provides the highest available payload. The available payload may be determined as a minimum between the remaining scheduled grant payload and the maximum supported payload.

Optionally, the sum of "remaining non-scheduled payload" for each MAC-d flow that may be multiplexed (or all non-scheduled MAC-d flows that may have data available) may also be taken into account when calculating the available payload. More specifically, the available payload may be determined as a minimum of (remaining scheduled grant payload+SUM (remaining non-scheduled payloads for all allowed non-scheduled flows)) and the maximum supported payload. If non-scheduled flows are allowed in one carrier only, (e.g., in the anchor carrier only), the available payload for the anchor carrier is considered.

If the non-scheduled grants are provided on a per carrier basis or if the non-scheduled transmissions are allowed on one carrier, the WTRU may give priority to the carrier that contains the highest priority non-scheduled MAC-d flow to be transmitted in that TTI or allows a non-scheduled MAC-d flow. For instance, if the non-scheduled transmissions are allowed on the primary carrier only and for the given HARQ process the WTRU is configured with non-scheduled data and data is available, the WTRU may give priority to the primary carrier (i.e., fill the primary carrier first). If in a given TTI the highest priority MAC-d flow does not correspond to a non-scheduled flow, but a non-scheduled flow is allowed to be multiplexed with the selected highest priority MAC-d flow, the WTRU may still give priority to the carrier which allows non-scheduled transmissions. Therefore, if any non-scheduled flows are allowed to be transmitted in a current TTI and non-scheduled data is available, the WTRU may first fill up the carrier which allows transmission of the non-scheduled flows. The WTRU fills up the selected carrier with non-scheduled and scheduled data up to the available power and/or grant according to the configured logical channel priority. The remaining carrier(s) is then filled up if data, power and grant are available for that carrier.

Alternatively, the WTRU may base its decision to select a carrier on one or a combination of CPICH measurement and HARQ error rates on each carrier, etc.

Example embodiments for E-TFC selection for independent maximum power limitation are explained hereafter. The WTRU may have a different transmission powers and maximum allowed power for each carrier, which may depend on the particular device configuration or design. This depends on implementation design, (e.g., a WTRU may be designed with two different power amplifiers and two different antennas), and/or on network control and configuration. It is also applicable if the WTRU pre-allocates the power between the carriers, or allocates the power in parallel, as described below. In these situations, the maximum power or available power that may be used by each carrier corresponds to the allocated power per carrier. The embodiments are also applicable to the case where power is shared between the carriers but the power is allocated or scaled between the carriers prior to filling up the carriers.

Where the powers are pre-allocated or the maximum amount of power is independent on each carrier, the MAC PDUs may have to be filled up sequentially due to the fact that the delivery order of RLC PDUs has to be maintained in order to allow proper operation of higher layers. Additionally, the WTRU may be buffer limited in which case enough data to transmit over one carrier may be available.

In this situation, the WTRU may initially choose the highest priority carrier P1 based on one of the embodiments described above. For instance, the WTRU may select the carrier with the higher power headroom, equivalently the carrier with the lower DPCCH power to be filled up with data first or the primary or secondary carrier may be filled up first. This allows, even a buffer limited WTRU to transmit most of its data, or its highest priority data, over the carrier with the best channel quality or over the carrier that allows transmission of the highest priority data, such as non-scheduled transmissions.

According to the highest priority MAC-d flow, associated HARQ profile and multiplexing list, the WTRU then fills up the available space on the transport block of carrier p1 (i.e., creates MAC-e or MAC-i to be sent on carrier p1), according to the "Maximum Supported Payload p1", "Remaining Scheduled Grant Payload p1", and remaining non-scheduled grant payload, if allowed and configured in the selected carrier, P1. As previously mentioned, this corresponds to the number of bits that may be transmitted according to the allowed power, allowed scheduled grant, and allowed non-serving grant, respectively. In this situation, allowed power and allowed grant may correspond to scaled values of the power and/or grant of each carrier or the configured powers or grants. This may be done if the power or grant is proportionally split between the two carriers or allocated in parallel. If SI needs to be sent, the WTRU may send it in carrier p1, or alternatively send it in the carrier in which the SI is configured to be transmitted.

Once the WTRU has completed the available space on carrier p1, it then fills up next carrier. At this point the WTRU may re-determine the highest priority MAC-d flow that has data to be transmitted and is allowed in the carrier being treated. At this point the highest priority MAC-d flow may be different than the one determined initially, prior to carrier p1 being filled up.

When determining the highest priority MAC-d flow the WTRU may, for every carrier, determine the highest priority MAC-d flow configured with data available amongst all MAC-d flows. In an alternate embodiment, the WTRU may, for every carrier for which E-TFC selection or highest priority MAC-d flow selection is being performed, determine the highest priority MAC-d flow amongst all MAC-d flows allowed to be transmitted on the given carrier.

If the carrier for which E-TFC selection is being performed does not allow a certain type of MAC-d flow, when determining the highest priority MAC-d flow the WTRU may not consider the MAC-d flows that are not allowed for transmission on the given carrier. For instance, if the WTRU is performing E-TFC selection for the second carrier, it may not include non-scheduled MAC-d flows in the selection of highest priority MAC-d flow. So if a non-scheduled MAC-d flow has data available and has the highest configured MAC-d priority the WTRU may not use this MAC-d flow as its highest priority MAC-d flow and may not use the HARQ profile, power offset and HARQ retransmission, and multiplexing list for the TTI for the carrier. For specific example, for HSPA dual carrier UL when treating the second carrier the WTRU may determine the highest priority MAC-d flow amongst all scheduled MAC-d flows.

Once the highest MAC-d flow is determined, the WTRU determines the new allowed MAC-d flows that may be multiplexed in this TTI, and the power offset based on the HARQ profile of the selected MAC-d flow to be used for the new carrier. The WTRU may then determine the Maximum Supported Payload and Remaining Scheduled Grant Payload according to the new power offset and fill up the carrier with data if available accordingly.

Alternatively, the WTRU may determine the Maximum Supported Payload and Remaining Scheduled payload for both carriers at the beginning of the E-TFC selection procedure or prior to filling up the carrier, which implies that the WTRU can use the same power offset for both carriers regardless of whether data from that first highest selected MAC-d flow is being transmitted on both carriers. In this case, the multiplexing list will remain the same on both carriers and may be a limiting factor when not enough data is available from those logical channels, but the WTRU has more power and grant available for transmission of other logical channels.

Once carrier p1 (which may be determined as above and filled up sequentially) is filled up with data, the WTRU immediately moves to the other carrier and continues to fill it up with data.

Alternatively, the carriers may be filled up in parallel, which implies that the data from all the allowed logical channels is split between the two carriers. In order to avoid out-of-order delivery, the data or the RLC buffer has to be split. For instance, if 10 RLC PDUs with SN 0 to 9 are available, RLC PDUs 0 to 4 are sent to carrier one and 5 to 9 are sent to carrier two. The WTRU then moves to the next logical channel if space still remains and the buffer is again split in the same way.

Alternatively, the E-TFC and carrier filling may be performed in parallel, but each carrier takes data from different logical channels. This implies that the WTRU selects the two highest priority MAC-d flows, determines the HARQ profile for each and the multiplexing list for each and maps them to the two individual carriers. This will allow the WTRU to fill up and perform E-TFC in parallel without risking out-of-order RLC delivery. However, this may result in situations where data from the highest logical channel is still available but the WTRU may no longer send them, since the carrier is full.

In another embodiment, data flows may be carrier specific. In this case the WTRU may perform the E-TFC selection procedure independently for each carrier.

Example embodiments for E-TFC selection for total combined maximum power limitation are described hereafter. Some of the aspects of these embodiments may also be applicable as described above if the power between the two carriers is allocated in parallel or some form of dynamic power allocation is performed.

In a sequential approach, when the WTRU maximum power is shared amongst both carriers, the WTRU may initially select the highest priority carrier (P1) using one of the embodiments described above. E-TFC restriction and selection may still be performed sequentially, wherein the available power and grant used are equivalent to the allocated or scaled power or grant.

Once the WTRU has selected the highest priority carrier, the WTRU performs the E-TFC selection and restriction procedure, where the highest priority MAC-d flow is selected and the power offset, the Maximum Supported payload p1 is determined, the Scheduled Available Payload is selected according to the serving grant of carrier P1 and the non-scheduled available payload is selected. If SI needs to be transmitted, it may be treated with the first selected carrier or alternatively it may be treated on the carrier in which it is allowed to be transmitted. In this case, the WTRU may perform a sequential E-TFC restriction procedure as described above, where the WTRU assumes all the power is available to be used by carrier P1 and assuming that no data is being transmitted on the secondary carrier. The WTRU creates a MAC-e or MAC-i PDU to be transmitted on this carrier according to the E-TFC selection. Alternatively, if the SI is sent in one carrier only (i.e., the anchor carrier only), then the E-TFC selection takes it into account when performing E-TFC for the carrier in which the SI is being sent.

The maximum supported payload, (i.e., E-TFC restriction), for the selected carrier may be determined, for example, according to the NRPM calculation. In the case where the WTRU has a retransmission in carrier x, then no E-TFC selection is performed for carrier x. The WTRU performs E-TFC selection and creates a MAC-i or MAC-e PDU for the carrier y, the remaining carrier.

The WTRU then has to create a MAC-e or MAC-i PDU for the remaining carrier. At this point the WTRU may re-determine (or determine for the first time if a retransmission is ongoing on carrier x) the highest priority MAC-d flow that has data to be transmitted and the power offset based on the HARQ profile of the selected MAC-d flow and the MAC-d flow multiplexing list. Alternatively, the WTRU uses the same power offset determined initially in the procedure.

The WTRU then performs the E-TFC restriction procedure for this second carrier. The WTRU may take into account the power that will be used from the first carrier and the remaining available power is used when calculating the maximum supported payload or when determining the set of supported E-TFCIs. Alternatively, the WTRU may subtract a "backoff power" (i.e., the particular power losses experienced when the WTRU transmits on two carriers in the same TTI), prior to performing the E-TFC restriction on the second carrier, (i.e., the second selected carrier), when two new transmissions take place or when one new transmission is taking place due to a HARQ retransmission in the other carrier.

In these embodiments described herein, the WTRU may be configured to not to transmit a DPCCH when it is determined that data does not need to be sent. The WTRU may also be configured to not transmit any data on a second carrier if it does not have enough power where the maximum power is allocated per carrier. For instance, if one of the carriers does not have enough power, the WTRU may use one carrier to transmit (the one that has the highest UPH or highest NRPM), instead of using the minimum set E-TFCI, or alternatively, the WTRU may not transmit in one of the carriers if both do not have enough power. The WTRU may use the minimum set on one of the carriers and may not transmit on the second.

The MAC-i or MAC-e PDU is then filled up according to the determined maximum supported payload, the scheduled available payload (according to the serving grant of this carrier), and the non-scheduled available payload, if applicable.

In another embodiment, the WTRU may select the E-TFC on each carrier in such a way that the transmission power (over all UL channels, i.e., DPCCH, E-DPCCH, HS-DPCCH, E-DPDCH) on each carrier is the same or the difference between the two is less than a pre-configured maximum value. This may be achieved, for instance, by calculating for a given transmission power level which E-TFCs may be transmitted on each carrier given the transmission power of the DPCCH and other channels on each carrier. For instance, assuming that the DPCCH power levels are 7 dBm and 10 dBm on, say, carriers 1 and 2 respectively, and that the power levels of the HS-DPCCH and E-DPCCH are each −3 dB below that of the DPCCH, if the transmission power level on each carrier is 18 dBm, the power headrooms on each carrier are 8 dB and 5 dB respectively, and the corresponding E-TFC sizes may be 600 bits and 300 bits. Thus the WTRU may transmit with equal power (of 18 dBm) on both carriers by selecting an E-TFC of 600 bits on the carrier 1 and an E-TFC of 300 bits on carrier 2.

This principle may be applied in different cases. If the WTRU transmission is limited by the maximum UL power, the WTRU may select the E-TFC on each carrier by splitting the maximum UL power equally between the two carriers (thus the UL power available to each carrier would be 3 dB below the maximum) and determining the maximum supported E-TFC on each carrier using the method disclosed above. If the WTRU transmission is limited by the amount of data in the WTRU buffer, the WTRU may seek the transmission power level of both carriers such that the amount of data that may be transmitted with the resulting E-TFCs on each carrier corresponds to the amount of data in the buffer.

In another embodiment, the WTRU may select the E-TFC on each carrier in such a way that the interference load incurred on each carrier is same or approximately the same. The interference load incurred on a carrier may, for instance, be estimated as the power ratio between the E-DPDCH power and the DPCCH power, which corresponds to the power ratio used for scheduling. Thus, provided that the scheduling grant and the power headroom is sufficient on both carriers, the WTRU selects the E-TFC on each carrier by determining how many bytes may be transmitted from the WTRU buffer, based on grant and by determining the needed E-TFC size on each carrier by dividing this number of bytes by 2 and applying the appropriate MAC headers.

This method would result equal power ratios on each carrier provided that mapping between reference power ratios and reference E-TFCs is the same between the carriers, and provided that all the data belong to logical channels that have the same HARQ offset. In case where the data belongs to logical channels that do not all have the same HARQ offset, the WTRU has to find which sharing of bytes that result in the same power ratio for both E-TFCs.

Embodiments for dual-carrier power back-off and maximum power reduction for multicarrier operations are disclosed hereafter. To relieve the WTRU power amplifier design and power consumption, the WTRU is typically allowed a certain maximum power reduction (MPR). This power reduction margin allows a WTRU implementation to reduce the maximum transmission power (this is also referred to as power back-off) to avoid causing unintended adjacent carrier interference due to power amplifier non-linearity.

In accordance with one embodiment, a power back-off may be applied when transmitting on two uplink carriers rather than one. The WTRU determines the amount of data to be transmitted on both carriers according to any of the embodiments described herein, and may apply a power back-off (i.e., reduction in total transmission power or per-carrier transmission power) if data is to be sent on two carriers. The application of a power back-off would then result in the use of a smaller E-TFCI on each carrier. The WTRU may determine whether more data may be sent using a single carrier without power back-off or using two carriers with power back-off, and select the option allowing for transmission of most total number of bits.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) for providing control information for multi-carrier uplink transmission, the WTRU comprising:
    a processor; and
    a memory having instructions that, when executed by the processor, cause the WTRU to:
        evaluate scheduling information for a plurality of uplink carriers independently,
        trigger transmission of scheduling information associated with a first uplink carrier when a first timer associated with the first uplink carrier expires, and
        trigger transmission of scheduling information associated with a second uplink carrier when a second timer associated with the second uplink carrier expires, wherein the first timer and the second timer have a same value on a condition that a serving grant associated with the first uplink carrier has a value "Zero Grant" and a serving grant associated with the second uplink carrier has the value "Zero Grant" or on a condition that the serving grant associated with the first uplink carrier has a non-"Zero Grant" value and the serving grant associated with the second uplink carrier has a non-"Zero Grant" value.

2. The WTRU of claim 1, wherein the first timer comprises a first timer T_SING (Timer Scheduling Information—"Zero_Grant"), and the second timer comprises a second timer T_SING.

3. The WTRU of claim 1, wherein the first timer comprises a first timer T_SIG (Timer Scheduling Information—different from "Zero_Grant"), and the second timer comprises a second timer T_SIG.

4. The WTRU of claim 1, wherein the plurality of uplink carriers comprise an anchor uplink carrier and at least one supplementary uplink carrier, and the instructions, when executed by the processor, further cause the WTRU to:
    calculate a power headroom on the anchor uplink carrier (UPHA) as measured on the anchor uplink carrier; and
    calculate a power headroom on a supplementary uplink carrier (UPHs) as measured on the supplementary uplink carrier.

5. The WTRU of claim 4, wherein the $UPH_A$ is a ratio of a maximum WTRU transmission power and a dedicated physical control channel (DPCCH) code power on the anchor uplink carrier, and the UPHs is a ratio of the maximum WTRU transmission power and a DPCCH code power on the supplementary uplink carrier.

6. The WTRU of claim 4, wherein the instructions, when executed by the processor, further cause the WTRU to:
    send the scheduling information comprising the UPHA over the anchor uplink carrier, and
    send the scheduling information comprising the UPHs over the supplementary uplink carrier.

7. The WTRU of claim 4, wherein the power headroom calculation on the supplementary uplink carrier is triggered on at least one of conditions:
    the $UPH_A$ becomes smaller than a pre-configured threshold;
    a total E-DCH buffer status (TEBS) becomes larger than a pre-configured threshold;
    a time required to empty a transmission buffer given a current grant;
    hybrid automatic repeat request (HARQ) offset and a ratio of active HARQ processes is longer than a configured value;
    a timer has expired;
    scheduling information transmission is triggered on the anchor carrier; or
    a grant on the anchor carrier is zero and data becomes available in a buffer.

8. The WTRU of claim 1, wherein the instructions, when executed by the processor, further cause the WTRU to:
    send a measurement report on a condition that a power headroom is larger or smaller than a power headroom threshold, a TEBS is larger than a TEBS threshold value, and an E-DCH transport format combination index (E-TFCI) corresponding to an E-TFCI threshold value is in a supported or blocked state for a configured period of time.

9. A method, implemented in a wireless transmit/receive unit (WTRU), for providing control information for multi-carrier uplink transmission, the method comprising:
    evaluating scheduling information for a plurality of uplink carriers independently; and
    triggering transmission of scheduling information associated with a first uplink carrier when a first timer associated with the first uplink carrier expires; and
    triggering transmission of scheduling information associated with a second uplink carrier when a second timer associated with the second uplink carrier expires, wherein the first timer and the second timer have a same value on a condition that a serving grant associated with the first uplink carrier has a value "Zero_Grant" and a serving grant associated with the second uplink carrier has the value "Zero_Grant" or on a condition that the serving grant associated with the first uplink carrier has a non-"Zero_Grant" value and the serving grant associated with the second uplink carrier has a non-"Zero_Grant" value.

10. The method of claim 9, wherein the first timer comprises a first timer T_SING (Timer Scheduling Information—"Zero_Grant"), and the second timer comprises a second timer T_SING.

11. The method of claim 9, wherein the first timer comprises a first timer T_SIG (Timer Scheduling Information—different from "Zero_Grant"), and the second timer comprises a second timer T_SIG.

12. The method of claim 9, wherein the plurality of uplink carriers comprise an anchor uplink carrier and at least one supplementary uplink carrier, the method further comprising:
calculating a power headroom on the anchor uplink carrier ($UPH_A$) as measured on the anchor uplink carrier; and
calculating a power headroom on a supplementary uplink carrier (UPHs) as measured on the supplementary uplink carrier.

13. The method of claim 12, further comprising:
sending the scheduling information comprising the $UPH_A$ over the anchor uplink carrier; and
sending the scheduling information comprising the UPHs over the supplementary uplink carrier.

14. The method of claim 12, wherein the $UPH_A$ is a ratio of a maximum WTRU transmission power and a dedicated physical control channel (DPCCH) code power on the anchor uplink carrier, and the UPHs is a ratio of the maximum WTRU transmission power and a DPCCH code power on the supplementary uplink carrier.

15. The method of claim 12, wherein the power headroom calculation on the supplementary uplink carrier is triggered on at least one of conditions:
the $UPH_A$ becomes smaller than a pre-configured threshold;
a total E-DCH buffer status (TEBS) becomes larger than a pre-configured threshold;
a time required to empty a transmission buffer given a current grant;
hybrid automatic repeat request (HARQ) offset and a ratio of active HARQ processes is longer than a configured value;
a timer has expired;
scheduling information transmission is triggered on the anchor carrier; or
a grant on the anchor carrier is zero and data becomes available in a buffer.

16. The method of claim 9, further comprising:
sending a measurement report on a condition that a power headroom is larger or smaller than a power headroom threshold, a TEBS is larger than a TEBS threshold value, and an E-DCH transport format combination index (E-TFCI) corresponding to an E-TFCI threshold value is in a supported or blocked state for a configured period of time.

* * * * *